US011212750B1

(12) United States Patent
Ali et al.

(10) Patent No.: US 11,212,750 B1
(45) Date of Patent: Dec. 28, 2021

(54) METHOD, DEVICE, AND MEDIUM FOR SPATIAL FREQUENCY REUSE IN WIRELESS NETWORKS

(71) Applicants: M Zulfiker Ali, Scarborough (CA); Bo Ran, Kanata (CA); Hassan Omar, Kanata (CA)

(72) Inventors: M Zulfiker Ali, Scarborough (CA); Bo Ran, Kanata (CA); Hassan Omar, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/937,544

(22) Filed: Jul. 23, 2020

(51) Int. Cl.
*H04W 52/18* (2009.01)
*H04W 74/08* (2009.01)

(52) U.S. Cl.
CPC ........... *H04W 52/18* (2013.01); *H04W 74/08* (2013.01)

(58) Field of Classification Search
CPC ...... H04W 52/18; H04W 74/08; H04L 1/0026
USPC .................................................... 455/522, 69
See application file for complete search history.

(56) References Cited

U.S. PATENT DOCUMENTS

| | | | | |
|---|---|---|---|---|
| 8,576,728 B2 * | 11/2013 | Omar | ...................... | H04L 43/10 370/247 |
| 9,565,567 B2 * | 2/2017 | Chaves | ................. | H04W 16/14 |
| 10,091,817 B2 * | 10/2018 | Barriac | ................. | H04W 52/52 |
| 10,104,664 B2 * | 10/2018 | Liu | ....................... | H04L 5/0007 |
| 10,314,054 B2 * | 6/2019 | Pao | ...................... | H04B 7/0619 |
| 10,321,405 B2 * | 6/2019 | Atefi | ................. | H04W 52/0245 |
| 10,321,485 B1 * | 6/2019 | Noh | ........................ | H04W 8/26 |
| 10,348,394 B1 * | 7/2019 | Bakr | .................... | H04B 7/0408 |
| 10,397,955 B2 * | 8/2019 | Park | .................. | H04W 74/0808 |
| 10,470,128 B2 * | 11/2019 | Noh | .................... | H04L 27/2602 |
| 10,470,138 B2 * | 11/2019 | Kwon | ................. | H04W 52/246 |
| 10,485,005 B2 * | 11/2019 | Pao | ......................... | H04L 5/001 |
| 10,498,670 B1 * | 12/2019 | Chu | ...................... | H04W 52/18 |
| 10,524,290 B1 * | 12/2019 | Chu | ...................... | H04L 27/0006 |
| 10,588,165 B1 * | 3/2020 | Chu | .................. | H04W 74/0816 |

(Continued)

FOREIGN PATENT DOCUMENTS

| CN | 106856629 A | 6/2017 |
|---|---|---|
| CN | 108353365 A | 7/2018 |

OTHER PUBLICATIONS

M. S. Afaqui, E. Garcia-Villegas, E. Lopez-Aguilera, and D. Camps-Mur, "Dynamic sensitivity control of access points for IEEE 802.11ax," in Proc. IEEE International Conference on Communications (ICC) May 2016.

(Continued)

*Primary Examiner* — Hai V Nguyen

(57) ABSTRACT

Methods, devices, and processor readable media for enabling a device operating within a wireless network to select an OBSS PD level that allows transmission of physical (PHY) layer protocol data units (PPDU) in minimum time and thereby enhancing the throughput of the network. An optimal OBSS PD level may be identified as the level that minimizes a linear combination of an estimated average contention time and an estimated average transmission time. The estimated contention time and estimated transmission time may be calculated based on data samples recorded at the given OBSS PD level. If insufficient data samples have been collected at the given OBSS PD level, then data samples from other OBSS PD levels may be used to estimate the average.

20 Claims, 10 Drawing Sheets

(56) References Cited

U.S. PATENT DOCUMENTS

| | | | |
|---|---|---|---|
| 10,694,452 B2 * | 6/2020 | Patwardhan | H04W 16/18 |
| 10,736,041 B2 * | 8/2020 | Atefi | H04W 52/0229 |
| 10,749,579 B1 * | 8/2020 | Omar | H04W 52/241 |
| 10,757,001 B2 * | 8/2020 | Omar | H04W 24/10 |
| 10,785,798 B2 * | 9/2020 | Seok | H04W 72/0453 |
| 10,827,359 B2 * | 11/2020 | Cherian | H04W 76/11 |
| 10,848,254 B2 * | 11/2020 | Patwardhan | H04B 17/318 |
| 10,880,750 B2 * | 12/2020 | Malichenko | H04W 24/02 |
| 2007/0060155 A1 * | 3/2007 | Kahana | H04W 72/085 |
| | | | 455/450 |
| 2007/0286122 A1 * | 12/2007 | Fonseca | H04W 72/085 |
| | | | 370/329 |
| 2008/0008133 A1 * | 1/2008 | Zhu | H04W 72/085 |
| | | | 370/332 |
| 2011/0075568 A1 * | 3/2011 | Omar | H04L 47/781 |
| | | | 370/242 |
| 2013/0229996 A1 * | 9/2013 | Wang | H04L 1/1685 |
| | | | 370/329 |
| 2014/0376453 A1 * | 12/2014 | Smith | H04W 74/0816 |
| | | | 370/328 |
| 2015/0149220 A1 * | 5/2015 | Omar | G06Q 10/02 |
| | | | 705/5 |
| 2015/0264578 A1 * | 9/2015 | Chaves | H04W 16/14 |
| | | | 370/338 |
| 2016/0374087 A1 * | 12/2016 | Liu | H04L 5/0007 |
| 2017/0086226 A1 * | 3/2017 | Wang | H04W 74/0808 |
| 2017/0094685 A1 * | 3/2017 | Noh | H04W 72/042 |
| 2017/0105143 A1 * | 4/2017 | Seok | H04W 74/0808 |
| 2017/0105217 A1 * | 4/2017 | Kwon | H04W 52/244 |
| 2017/0127448 A1 * | 5/2017 | Zhou | H04W 74/0816 |
| 2017/0142659 A1 * | 5/2017 | Noh | H04W 52/0245 |
| 2017/0188368 A1 * | 6/2017 | Cariou | H04L 61/6022 |
| 2017/0188376 A1 * | 6/2017 | Noh | H04W 72/085 |
| 2017/0245224 A1 * | 8/2017 | Barriac | H04W 52/343 |
| 2017/0289819 A1 * | 10/2017 | Kim | H04W 74/0808 |
| 2017/0325254 A1 * | 11/2017 | Zhou | H04W 74/0808 |
| 2017/0331697 A1 * | 11/2017 | Cariou | H04W 72/08 |
| 2017/0374681 A1 * | 12/2017 | Kim | H04W 84/12 |
| 2018/0014327 A1 * | 1/2018 | Park | H04L 69/323 |
| 2018/0035438 A1 * | 2/2018 | Pao | H04W 72/0413 |
| 2018/0070353 A1 * | 3/2018 | Yang | H04W 72/0446 |
| 2018/0084554 A1 * | 3/2018 | Chu | H04W 52/243 |
| 2018/0132278 A1 * | 5/2018 | Oteri | H04W 74/0808 |
| 2018/0249503 A1 * | 8/2018 | Kim | H04W 74/0816 |
| 2018/0324859 A1 * | 11/2018 | Kim | H04L 1/0031 |
| 2019/0124695 A1 * | 4/2019 | Seok | H04W 72/0473 |
| 2019/0141749 A1 * | 5/2019 | Seok | H04W 72/0446 |
| 2019/0208423 A1 * | 7/2019 | Cherian | H04W 16/10 |
| 2019/0230703 A1 * | 7/2019 | Lv | H04W 52/246 |
| 2019/0335483 A1 * | 10/2019 | Wang | H04B 1/525 |
| 2019/0335498 A1 * | 10/2019 | Lanante | H04W 74/02 |
| 2019/0335502 A1 * | 10/2019 | Lanante | H04W 16/14 |
| 2019/0335503 A1 * | 10/2019 | Park | H04W 74/002 |
| 2019/0363969 A1 * | 11/2019 | Omar | H04W 24/10 |
| 2020/0008237 A1 * | 1/2020 | Lanante | H04W 52/243 |
| 2020/0037334 A1 * | 1/2020 | Pao | H04W 72/0413 |
| 2020/0045637 A1 * | 2/2020 | Noh | H04L 72/0466 |
| 2020/0083969 A1 * | 3/2020 | Patwardhan | H04L 1/1614 |
| 2020/0187011 A1 * | 6/2020 | Malichenko | H04W 24/02 |
| 2020/0288323 A1 * | 9/2020 | Silverman | H04W 74/0825 |
| 2020/0413445 A1 * | 12/2020 | Seok | H04W 72/0453 |
| 2020/0413446 A1 * | 12/2020 | Seok | H04W 16/10 |
| 2021/0014692 A1 * | 1/2021 | Cherian | H04W 72/082 |
| 2021/0014695 A1 * | 1/2021 | Minotani | H04W 72/04 |
| 2021/0051664 A1 * | 2/2021 | Bhattacharya | H04W 72/046 |
| 2021/0076221 A1 * | 3/2021 | Malichenko | H04W 24/02 |

OTHER PUBLICATIONS

C. K. Chau, I. W. H. Ho, Z. Situ, S. C. Liew, and J. Zhang, "Effective Static and Adaptive Carrier Sensing for Dense Wireless CSMA Networks," IEEE Transactions on Mobile Computing, vol. 16, No. Feb. 2, 2017.

Kulkarni and F. Cao, "Dynamic Sensitivity Control to improve Spatial Reuse in Dense Wireless LANs," In Proc. ACM International Conference on Modeling, Analysis and Simulation of Wireless and Mobile Systems (MSWiM '16) Nov. 2016.

Hewlett Packard Enterprise, Further Implications of Wi-Fi Field Measurements for Multi-Node Testing, R4-1701879, 3GPP TSG-RAN WG4 Meeting #82, Athens, Greece Feb. 13-17, 2017, 10 pages.

* cited by examiner

METHOD, DEVICE, AND MEDIUM FOR SPATIAL FREQUENCY REUSE IN WIRELESS NETWORKS

RELATED APPLICATIONS

This is the first patent application related to this matter.

TECHNICAL FIELD

The present application relates to mobile air interface technologies, in particular to methods, devices, and processor readable media for spatial frequency reuse in a wireless network.

BACKGROUND

Networks that operate according to Wi-Fi protocols, including IEEE 802.11 protocols such as the IEEE 802.11ax specified in IEEE Draft P802.11ax_D6.0, are designed to manage interference, both within a wireless network, and between two or more wireless networks operating in close proximity. A single wireless network operating according to a Wi-Fi protocol, typically corresponding to a single access point, is referred to as a Basic Service Set (BSS). (The terms "network", "wireless network", "Wi-Fi network", and "BSS" may be used interchangeably herein.)

Interference in Wi-Fi networks is managed by a Clear Channel Assessment (CCA) procedure, which operates according to a Listen Before Talk (LBT) principle. Prior to transmitting data over a channel of a network, a device operating according to a Wi-Fi protocol (also called a "Wi-Fi device", "station", or "STA" herein) uses LBT to detect whether the channel is clear for transmission, or whether it is in use and therefore may not be used for transmission yet. LBT uses a threshold, packet Detect (PD), to detect use of the channel by other Wi-Fi devices. If the detected signals within the channel are below the PD level, the device considers the channel to be clear.

To manage cases of two or more overlapping BSSs (OBSS), various approaches have been taken to enable the sharing of Wi-Fi channels in the overlapping space (referred to as "spatial reuse"). One approach to managing such inter-network or OBSS interference is to define Spatial Reuse Groups (SRGs) by arranging Wi-Fi access points (APs) into predefined groups that distinguish between inter-BSS frames transmitted by stations within the SRG and inter-BSS frames transmitted by stations outside the SRG. This may allow stations operating within an SRG to efficiently allocate channel usage within the overlap of multiple BSSs.

However, a BSS that is not part of an SRG still needs to manage spatial reuse by negotiating channel usage with any OBSS.

FIG. 1 shows an OBSS environment 100 wherein a first wireless network (BSS 1) 112, defined by access point AP 1 108, overlaps in space with a second wireless network (BSS 2) 114, defined by access point AP 2 110. Several Wi-Fi devices (STA 102) are only within the area of BSS 1 112; several others (STA 106) are only within the area of BSS 2 114; and at least one other (STA 104) is in the overlapping area of BSS 1 112 and BSS 2 114. The station STA 104 within the OBSS area needs to be able to negotiate channel usage with stations in both BSS 1 112 and BSS 2 114. In the examples described herein, STA 104 is associated with BSS 1 112 (i.e. it is configured to communicate over the first network 112), hence BSS 2 114 is considered an overlapping BSS with respect to STA 104. Furthermore, the access points 108, 110 of each network 112, 114 are contained with in the OBSS area.

The default behaviour for a station such as AP 1 108, or AP 2 110, or STA 104 in an OBSS scenario is to listen for data units (specifically, physical layer protocol data units (PPDU)) transmitted over either of the OBSSs 112, 114 to perform clear channel assessment (CCA). If an OBSS PPDU is received with a received signal strength indicator (RSSI) greater than or equal to a minimum PD level of negative 82 decibel-milliwatts (−82 dBm), the channel is considered busy, and concurrent transmission is not possible. However, if the PD threshold for detecting OBSS PPDUs is increased above the received interference level (i.e. if the PD, normally set at −82 dBm, is increased above the RSSI of a received OBSS PPDU), the received interference can be disregarded and the channel can be considered clear or idle. However, in order not to disrupt the ongoing transmission in the OBSS, the station 104 (AP 1 108, AP 2 110, or STA 104) needs to decrease its transmit power.

FIG. 2 is a graph 200 showing the relationship between OBSS PD level and corresponding transmit power. The transmit power (Tx Power Level 204) varies along the X axis and the OBSS PD level 202 varies along the Y axis, with the area under the curve 212 indicating permissible transmit power levels for a given OBSS PD level. If the OBSS PD level is set to its minimum value (Minimum OBSS PD level 208, i.e. −82 dBm in the 802.11ax standard), then transmit power 204 is unconstrained. The standard defines a reference transmit power level 210 to be used in a clear channel at the minimum OBSS PD level 208. The level of permissible transmit power 204 decreases as the OBSS PD level 202 increases, representing relative insensitivity to simultaneous activity on the channel and therefore greater need for low-power transmission to avoid interfering with other activity on the channel. At the Maximum OBSS PD level 206, representing the most insensitive setting for detecting activity on the channel, the permissible transmit power 204 is capped at a minimum transmit power level 214, representing the most highly-constrained scenario for transmit power.

Thus, when a low value is chosen for the OBSS PD level, the transmit power may be high. The higher transmit power results in a higher data rate and consequently lower transmission time. However, a low OBSS PD value means that the channel is more likely to be assessed to be busy, resulting in a higher average contention time (i.e. the length of time a device has to wait before making a transmission due to the channel being busy).

On the other hand, choosing a higher value for the OBSS PD level will result in lower transmission power, which in turn reduces the data rate. This reduced data rate can increase the transmission time for the device, which may adversely affect the throughput of the network. Therefore, proper selection of an OBSS PD level is an important factor for achieving expected throughput gain over the network.

There thus exists a need for a method for OBSS PD level selection for wireless devices operating in non-SRG environments that optimizes throughput over the network.

SUMMARY

In various embodiments described herein, methods, devices, and processor readable media are provided for enabling a device operating within a wireless network to select an OBSS PD level that allows transmission of data units in minimum time and thereby potentially enhancing the throughput of the network. In some embodiments, an optimal OBSS PD level may be identified as the level that minimizes a linear combination of an estimated average contention time and an estimated average transmission time. The estimated contention time and estimated transmission time may be calculated in some embodiments based on data samples recorded at the given OBSS PD level. If insufficient data samples have been collected at the given OBSS PD level, then data samples from other OBSS PD levels may be used to estimate the average in some embodiments.

As used herein, a statement that an element is "for" a particular purpose may mean that the element performs a certain function or is configured to carry out one or more particular steps or operations, as described herein.

As used herein, statements that a second signal or value is "based on" a first signal or value may mean that characteristics of the second signal or value are affected or determined at least in part by characteristics of the first signal or value. The first signal or value may be considered an input to an operation or calculation, or a series of operations or calculations, that produces the second signal or value as an output that is not independent from the first signal or value.

As used herein, the term "average" may refer to an arithmetic mean of a set of numbers or values. In some embodiments, an "average" may instead be calculated as a median value of the set of number or values. In other embodiments, an "average" may be a weighted or adjusted average of the set of numbers or values. In other embodiments, an "average" may be a mode of the set of numbers or values, or it may be a mean, median or mode of the set of numbers or values after outliers (e.g., exceptionally low or high numbers) or other anomalous values in the set have been discarded.

As used herein, an "estimate" or "estimated value" of a first item refers to a predicted value for the first item, the predicted value being measured, computed or calculated value based on one or more collected values of the first item and/or a second item. Thus, for example, an average contention time associated with a first transmit power level may be estimated by performing a calculation using one or more contention time samples collected in association with the first transmit power level, or by performing a calculation using one or more contention time samples collected in association with a second transmit power level, or by some combination thereof. In some examples, an estimate may be a measured value. To "estimate" an item, similarly, shall mean to generate an estimated value for that item as described above.

As used herein, the term "determine" may mean to compute or calculate based upon available information. In some contexts, it may mean to fix or specify a value, typically based on a result ascertained through computation or calculation based upon available information.

As used herein, the term "select" may mean to fix or specify an item or value, sometimes by choosing among several available options. A selection may be made with reference to one or more criteria.

In some aspects, the present disclosure describes a device. The device comprises a wireless communication link for communicating over a wireless network. The device further comprises a controller configured to estimate an average transmission duration for each of one or more overlapping basic service set (OBSS) packet detection (PD) levels of the wireless network, estimate an average contention time for each of the one or more OBSS PD levels, select a transmission OBSS PD level based on a linear combination of the estimated average transmission duration and estimated average contention time for each of the one or more OBSS PD levels, and use the wireless communication link to transmit data over the wireless network at a transmit power level corresponding to the selected transmission OBSS PD level.

According to a further aspect, the present disclosure describes a method. An average transmission duration is estimated for each of one or more overlapping basic service set (OBSS) packet detection (PD) levels of a wireless network. An average contention time is estimated for each of the one or more OBSS PD levels. A transmission OBSS PD level is selected based on a linear combination of the estimated average transmission duration and estimated average contention time for each of the one or more OBSS PD levels. Data is transmitted over the wireless network at a transmit power level corresponding to the selected transmission OBSS PD level.

In some examples, the device further comprises a memory storing one or more contention time samples. Each contention time sample corresponds to an actual contention time recorded for the transmission of a data unit over the wireless network by the device. The controller is further configured to identify a number of contention time samples associated with a first OBSS PD level of the one or more OBSS PD levels, and in response to determining that the number of contention time samples associated with the first OBSS PD level satisfies a predetermined sample number threshold, estimate the average contention time for the first OBSS PD level as the average of the stored contention time samples associated with the first OBSS PD level.

In some examples, the controller is further configured to, in response to determining that the number of contention time samples associated with the first OBSS PD level does not satisfy the predetermined sample number threshold, estimate the average contention time for the first OBSS PD level based on a plurality of contention time samples associated with a second OBSS PD level.

In some examples, estimating the average contention time for the first OBSS PD level based on the plurality of contention time samples associated with a second OBSS PD level comprises a number of steps. An average contention time $T_m$ for the second OBSS PD level is determined as the average contention time of the stored contention time samples associated with the second OBSS PD level. A first fraction $D_m$ of contention time at the second OBSS PD level attributable to reception of an OBSS frame is determined by dividing the sum of the durations of each OBSS frame received by the device in a first time period, when employing the second OBSS PD level, with a received signal strength indicator (RSSI) greater than or equal to the second OBSS PD level, by the sum of the stored contention time samples associated with the second OBSS PD level in the first time period. A second fraction $(1-D_m)$ of contention time at the second OBSS PD level not attributable to reception of an OBSS frame is determined, the sum of the first fraction and second fraction being equal to one. A first value $A_k$ proportional to the total duration of OBSS frames received in the first time period having an RSSI equal to or greater than the first OBSS PD level is determined. A second value $A_m$ proportional to the total duration of OBSS frames received in the first time period having an RSSI equal to or greater than the second OBSS PD level is determined. The average contention time for the first OBSS PD level is estimated as being equal to the average contention time for the second OBSS PD level times the second fraction, plus the average contention time for the second OBSS PD level times the first fraction times the first value $A_k$ divided by the second value $A_m$ such that $(T_k=T_m(1-D_m)+T_mD_mA_k/A_m)$.

In some examples, the controller is further configured to select the second OBSS PD level based on the number of contention time samples associated with the second OBSS PD level.

In some examples, the controller is further configured to select the second OBSS PD level based on the proximity of the first OBSS PD level to the second OBSS PD level.

In some examples, the controller is further configured to, in response to determining that the number of contention time samples associated with the first OBSS PD level does not satisfy the predetermined sample number threshold, estimate the average contention time for the first OBSS PD level based on a plurality of contention time samples associated with a plurality of OBSS PD levels.

In some examples, the controller is further configured to, in response to determining that the contention time samples in the memory do not satisfy a sample population metric, select a minimum OBSS PD level as the transmission OBSS PD level.

In some examples, the minimum OBSS PD level is between negative 85 decibel-milliwatts (dBm) and negative 70 dBm.

In some examples, the controller is configured to estimate the average transmission duration for an OBSS PD level by identifying a receiver station in communication with the device through the wireless network, identifying an estimated size of a data unit to be transmitted by the device to the receiver station through the wireless network, determining a data rate that can be used for data unit transmission to the receiver station through the wireless network at the OBSS PD level, and estimating the average transmission duration for the OBSS PD as equal to the estimated size of the data unit divided by the data rate.

In some examples, identifying the estimated size of the data unit comprises identifying an average size of one or more data units previously transmitted by the device to the receiver station.

In some examples, the device further comprises a memory storing one or more contention time samples. Each sample corresponds to an actual contention time recorded for the transmission of a data unit over the wireless network by the device. The controller is further configured to identify a number of contention time samples associated with a first OBSS PD level of the one or more OBSS PD levels. The controller is further configured to, in response to determining that the number of contention time samples associated with the first OBSS PD level satisfies a predetermined sample number threshold, estimate the average contention time for the first OBSS PD level as the average of the stored contention time samples associated with the first OBSS PD level. The controller is further configured to, in response to determining that the number of contention time samples associated with the first OBSS PD level does not satisfy the predetermined sample number threshold, estimate the average contention time for the first OBSS PD level based on a plurality of contention time samples associated with a second OBSS PD level. Selecting the transmission OBSS PD level comprises determining the linear combination of the estimated average transmission duration and estimated average contention time for each of the one or more OBSS PD levels, identifying an OBSS PD level of the one or more OBSS PD levels having a minimized linear combination of the one or more OBSS PD levels, and selecting the identified OBSS PD level as the transmission OBSS PD level.

According to a further aspect, the present disclosure describes a non-transitory processor readable medium having tangibly stored thereon executable instructions that, when executed by a controller, cause the controller to perform the method steps identified above.

BRIEF DESCRIPTION OF THE DRAWINGS

Reference will now be made, by way of example, to the accompanying figures which show example embodiments of the present application, and in which.

Like reference numerals are used throughout the Figures to denote similar elements and features. While aspects of the invention will be described in conjunction with the illustrated embodiments, it will be understood that it is not intended to limit the invention to such embodiments.

DETAILED DESCRIPTION OF EXAMPLE EMBODIMENTS

The present disclosure teaches methods, devices, and processor readable media for transmitting data in a wireless network. Some embodiments may enable a device operating within a wireless network to select an OBSS PD level that allows transmission of physical (PHY) layer protocol data units (PPDU) in minimum time and thereby enhance the throughput of the network.

Due to hardware limitations, instantaneous or concurrent interference received from an OBSS (e.g., BSS 2 114) cannot be used to select an OBSS PD level for a device (e.g., AP 1 108) for communicating over its respective network (e.g., BSS 1 112). Therefore, non-SRG algorithms and methods are disclosed herein that may be used to select an OBSS PD level based on previously known channel conditions. The OBSS PD level may then be dynamically adjusted through continuous detection of interference from the OBSSs.

Selection of the OBSS PD level may be based on the transmit power requirement of a receiver station (i.e. the station within the device's BSS to which the device intends to transmit data). If the transmit power is reduced, some of the stations on the periphery of the BSS will not be able to receive the data transmitted by the device, which limits the amount by which the transmit power may be decreased and thus the amount by which the OBSS PD level may be increased. In some embodiments, not all stations within the BSS are considered for determining the OBSS PD level to be used by the transmitting device. Rather, only the receiver station which is going to receive the impending transmission by the device is taken into consideration. This allows the OBSS PD level to increase more than it would be able to if all stations within the BSS, including those at the periphery, needed to be taken into account.

The actual channel contention time at a given OBSS PD level can be monitored for each PPDU transmission. This contention time varies with the OBSS PD level. When the OBSS PD level is lower, the device will experience higher channel contention time due to exposure to OBSS interference. On the other hand, a higher OBSS PD level will tend to reduce the channel contention time. However, the relation between the decrease of contention time and the increase of OBSS PD level is not linear. Contention time has two components: a first component is due to the reception of intra-BSS PPDUs (i.e. PPDUs received from the BSS associated with the device) and other non-Wi-Fi interference. This first component is independent of the OBSS PD level. The second component accounts for the reception of OBSS PPDUs (i.e. PPDUs received from the overlapping BSS not associated with the device). This component can be reduced by setting a higher OBSS PD level.

Figure 1:
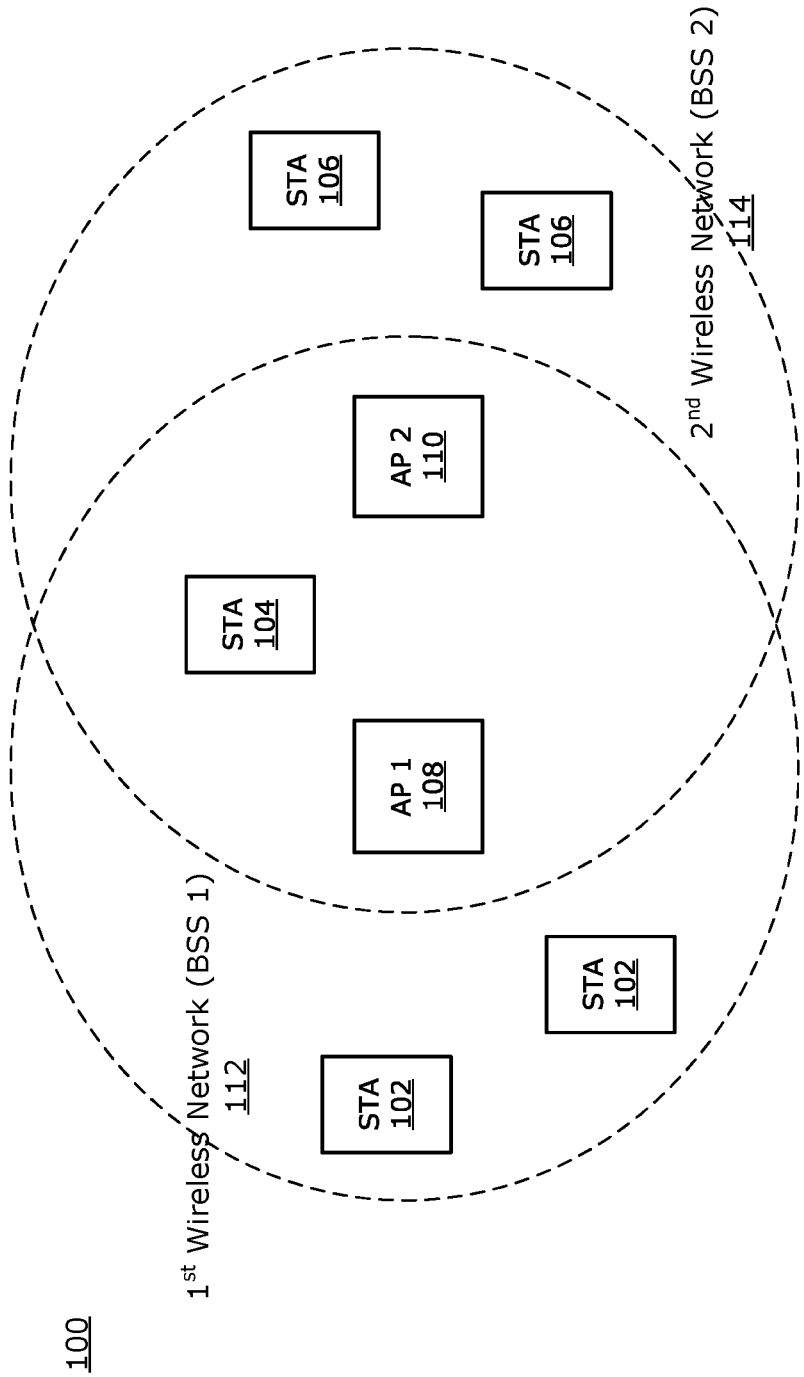
FIG. 1 is a block diagram of an OBSS environment, showing an example environment in which example embodiments in accordance with the present disclosure may operate.

FIG. 1, referred to above, illustrates an example OBSS environment in which example embodiments can operate. The stations (STAB 102, 104, 106) may include fixed, portable, and moving stations. The example of FIG. 1 illustrates a single fixed STA for each BSS 112, 114, namely an access-point station (AP 1 108 and AP 2 110), and a plurality of STAB 102, 104, 106 that may be portable or mobile. The two networks 112, 114 may operate according to one or more communications or data standards or technologies, however in at least some examples the network 100 is a WLAN, and in at least some examples is a next generation Wi-Fi compliant network that operates in accordance with one or more protocols from the 802.11 family of protocols.

Each STA 102, 104, 106 may be a laptop, a desktop PC, PDA, Wi-Fi phone, wireless transmit/receive unit (WTRU), mobile station (MS), mobile terminal, smartphone, mobile telephone, sensor, internet of things (IOT) device, or other wireless enabled computing or mobile device. In some embodiments, a STA 102, 104, 106 comprises a machine which has the capability to send, receive, or send and receive data in one of the networks 112, 114 but which performs primary functions other than communications. Each AP 108, 110 may comprise a network access interface which functions as a wireless transmission and/or reception point for STAB 102, 104, 106 in its respective network 112, 114. Each AP 108, 110 may be connected to a backhaul network (not shown) which enables data to be exchanged between the AP 108, 110 and other remote networks (including for example the Internet), nodes, APs, and devices (not shown). In some examples, STAB 102, 104, 106 may be configured to communicate with each other in addition to communicating with their respective AP 108, 110.

Figure 3:
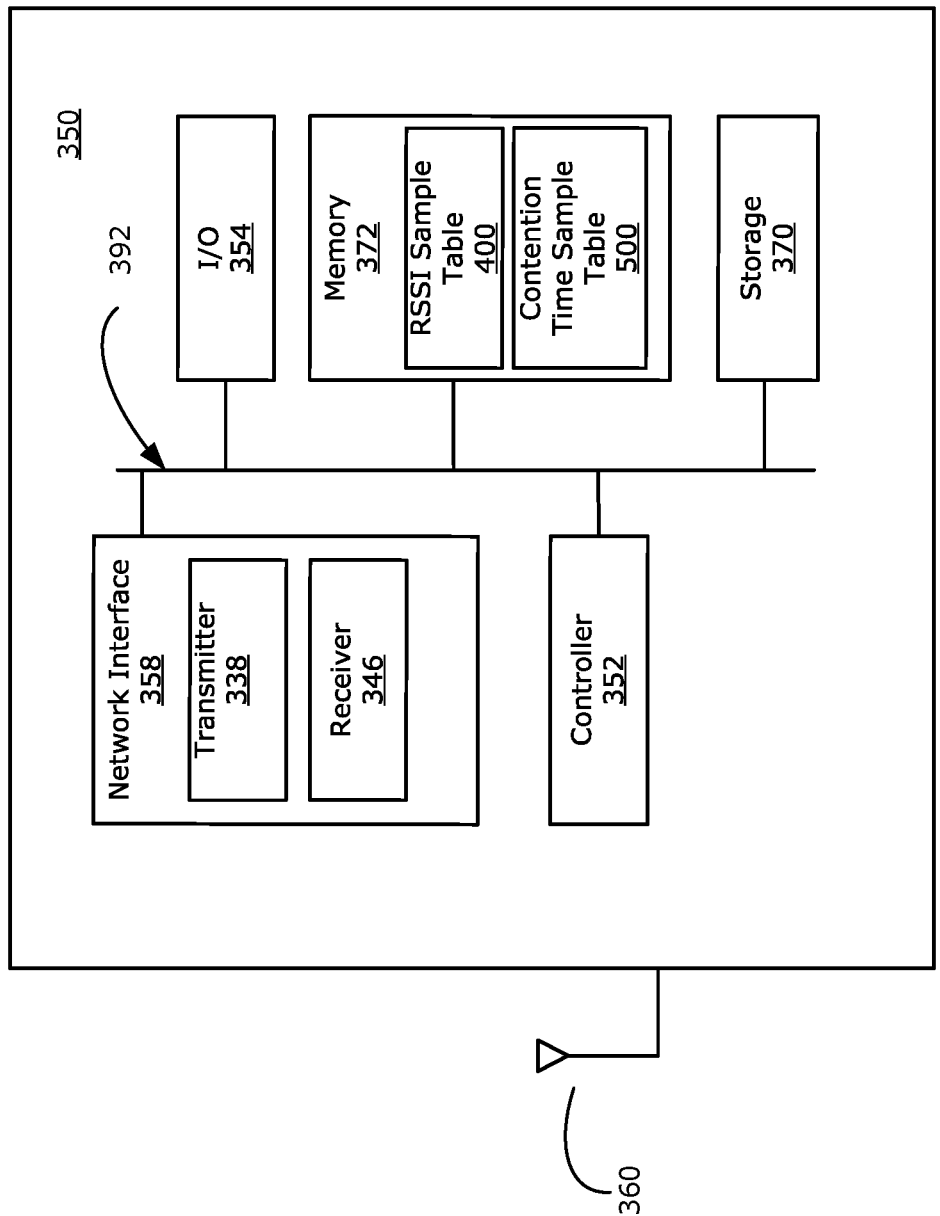
FIG. 3 is an example device used to manage spatial reuse according to example embodiments described herein.

FIG. 3 illustrates an example device 350 which may be used to implement methods described herein, for example AP 1 108, AP 2 110, or STA 104 located in an OBSS area.

Other devices suitable for implementing the methods described in the present disclosure may be used, which may include components different from those discussed below. Although FIG. 3 shows a single instance of each component, there may be multiple instances of each component in the device 350.

The device 350 may include one or more controllers 352, such as a processor, a microprocessor, an application-specific integrated circuit (ASIC), a field-programmable gate array (FPGA), dedicated logic circuitry, or combinations thereof. The device 350 may also include one or more input/output (I/O) interfaces 354, which may enable interfacing with one or more appropriate input devices and/or output devices (not shown). One or more of the input devices and/or output devices may be included as a component of the device 350 or may be external to the device 350. The device 350 may include one or more network interfaces 358 for wired or wireless communication with a network. In example embodiments, network interfaces 358 include one or more wireless interfaces such as transmitter 318 and receiver 346 that enable communications in a WLAN such as BSS 1 112. The network interface(s) 358 may include interfaces for wired communication links (e.g., Ethernet cable) and/or wireless communication links (e.g., one or more radio frequency links) for intra-network and/or inter-network communications. The network interface(s) 358 may provide wireless communication via one or more transmitters or transmitting antennas, one or more receivers or receiving antennas, and various signal processing hardware and software, for example. In this regard, some network interface(s) 358 may include respective processing systems that are similar to device 350. In some embodiments, the network interface(s) 358 may manage transmission and reception parameters such as transmit power and packet detection (PD) level, whereas in other embodiments one or both of these parameters may be set by the controller 352. In this example, a single antenna 360 is shown, which may serve as both transmitting and receiving antenna. However, in other examples there may be separate antennas for transmitting and receiving. The network interface(s) 358 may be configured for sending and receiving data to a backhaul network or to other STAB, user devices, access points, reception points, transmission points, network nodes, gateways or relays (not shown) in the first network (BSS 1 112).

The device 350 may also include one or more storage units 370, which may include a mass storage unit such as a solid state drive, a hard disk drive, a magnetic disk drive and/or an optical disk drive. The device 350 may include one or more memories 372, which may include a volatile or non-volatile memory (e.g., a flash memory, a random access memory (RAM), and/or a read-only memory (ROM)). The non-transitory memory(ies) 372 may store instructions for execution by the processing device(s) 352, such as to carry out the present disclosure. The memory(ies) 372 may include other software instructions, such as for implementing an operating system and other applications/functions. In some examples, one or more data sets and/or module(s) may be provided by an external memory (e.g., an external drive in wired or wireless communication with the device 350) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

In some embodiments, the memory 372 may stored store data used by the controller 352 to implement the methods and operations described herein. The illustrated example device 350 shows an RSSI sample table 400 and a contention time sample table 500 stored in the memory 372, both of which will be described in greater detail below.

There may be a bus 392 providing communication among components of the device 350, including the controller(s) 352, I/O interface(s) 354, network interface(s) 358, storage unit(s) 370, memory(ies) 372. The bus 392 may be any suitable bus architecture including, for example, a memory bus, a peripheral bus or a video bus.

Examples will now be described with reference to the example environment of FIG. 1 and the example device 350 of FIG. 3. The methods and operations described below are described as being carried out on a device, which will be referred to as the example device 350 of FIG. 3 and will be described as corresponding to AP 1 108 of FIG. 1, which communicates in association with the first network BSS 1 112 and experiences inteference from an overlapping BSS, namely the second network BSS 2 114. It will be appreciated that device 350, AP 1 108, BSS 1 112 and BSS 2 114 are referred to merely as examples, and that the described methods and operations may be carried out on any suitable device in any suitable OBSS environment. In some examples, the device 350 performing the methods described herein may be resident not within access point AP 1 108 but in station such as STA 104 inhabiting an OBSS area and in communication with AP 1 108.

In operation, AP 1 108 will perform the methods and operations described herein when AP 1 108 detects OBSS interference due to AP 1 108 being within the OBSS area while data is being transmitted across the second network 114.

In an example embodiment, a device 350 communicating over a Wi-Fi network in an OBSS environment may populate an RSSI sample table 400 by monitoring received RSSI of both intra-BSS PPDUs (received from stations within the device's BSS) and OBSS PPDUs (received from stations within another BSS overlapping with the device's BSS). A contention time sample table 500 may be populated by monitoring the actual channel contention time encountered by the device 350 when attempting to transmit data at a given OBSS PD level. In some embodiments, until the contention time sample table 500 is sufficiently populated, packet transmission takes place at a minimum OBSS PD level (e.g., –82 dBm). As used herein, "contention time" will be understood to refer to channel contention time.

The actual channel contention time for each transmission is recorded in the contention time sample table 500. Once a data sample population metric is satisfied by the number of actual contention time samples stored for the minimum OBSS PD level, the population of the contention time sample table 500 is considered complete, and the device 350 may begin using higher OBSS PD levels than the minimum OBSS PD level. From the stored data samples of actual channel contention time (initially at the minimum OBSS PD level, but later at higher OBSS PD levels once the data sample table has been populated), the estimated average channel contention time for various OBSS PD levels may be calculated based on the received interference from the OBSS. The device continuously updates the contention time sample table 500 when a packet is transmitted, and updates the RSSI sample table 400 when an interfering PPDU is received from either the device's BSS 112 or the overlapping BSS 114.

As used herein, the terms "sample", "data sample", "stored sample", and "recorded sample" may be used interchangeably. Each refers to data collected from actual operation of the device and recorded or stored on the device, e.g., in the memory 372. The values may include data associated with an actual contention time encountered when transmitting at a given OBSS PD level (a "contention time sample"), the data associated with receipt of an interfering PPDU (a "RSSI sample"), or any other data recorded in connection with operating the device.

In some embodiments, the sample population metric is satisfied when N contention time data samples have been collected at the minimum OBSS PD level. In some embodiments, N may be set equal to 50, but any positive number may be used for N. In other embodiments, the sample population metric may compare the number of samples to a value calculated dynamically and/or based on other data on the device 350, such as configuration variables set by a user.

Figure 4:
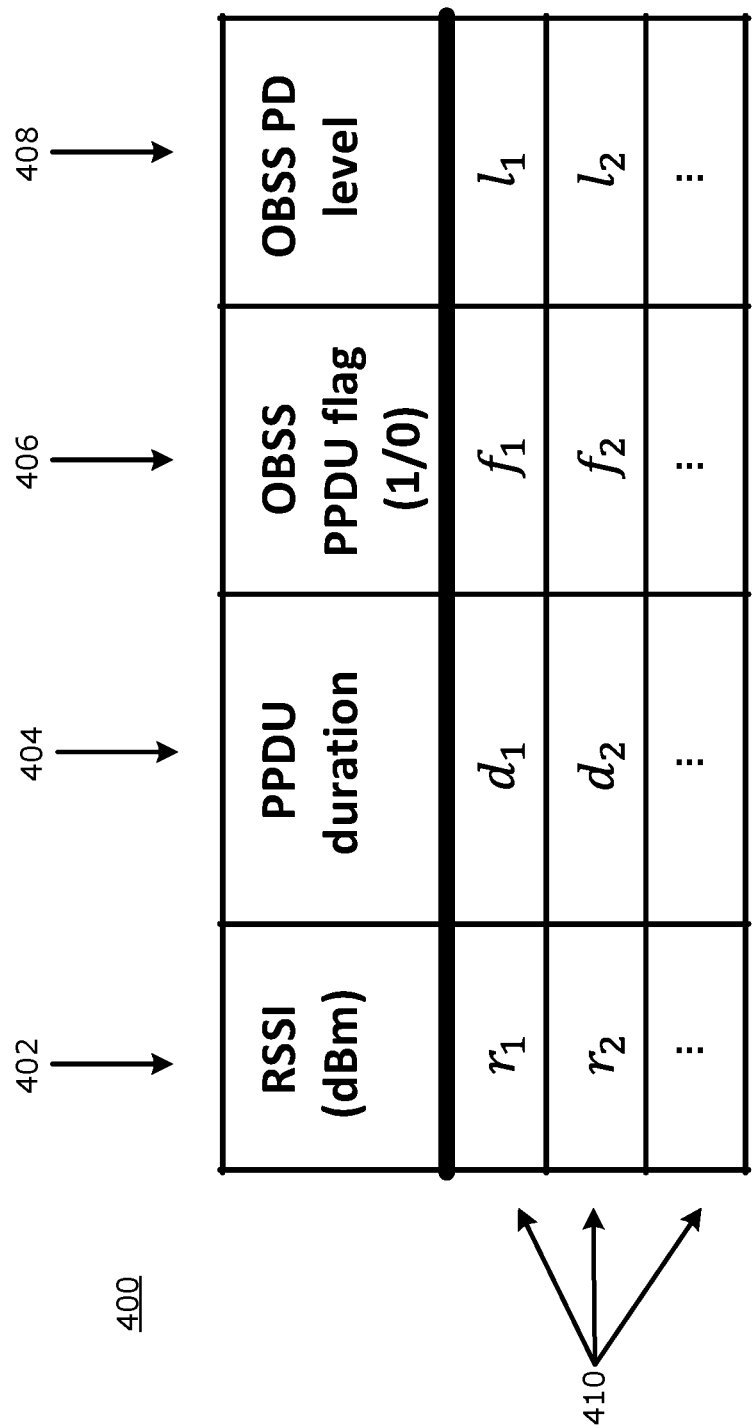
FIG. 4 is a received signal strength indicator (RSSI) table according to example embodiments described herein.

FIG. 4 shows an example RSSI sample table 400. The RSSI sample table 400 stores a number of RSSI samples 410, each RSSI sample 410 representing data collected in connection with receipt of an interfering PPDU by the device 350. A given RSSI sample 410 denoted by index m includes several data fields shown as columns of the table 400. RSSI 402 $r_m$ represents the RSSI of the received PPDU (measured in dBm). PPDU duration 404 $d_m$ represents the length of time over which the PPDU was received. An OBSS PPDU flag 406 $f_m$ represents whether the PPDU was associated with the device's own BSS (e.g., value 0) or associated with an overlapping BSS (e.g., value 1). OBSS PD level 408 $I_m$ represents the OBSS PD level of the device 350 when the PPDU was detected. In some embodiments, the OBSS PPDU flag 406 value may be referred to as the color of the BSS from which the PPDU originated.

The RSSI sample table 400 is populated by the physical protocol (PHY) layer of the device 350 in some embodiments. The PHY layer continuously updates the RSSI sample table 400 as PPDUs are detected. The medium access (MAC) layer receives parameters $\{r_i\ 402, d_i\ 404, f_i\ 406, v_i\ 408\}$ from the PHY layer report as soon as an interfering PPDU is received by the PHY layer. The parameters are recorded in the RSSI sample table 400. In some embodiments, every entry in the RSSI sample table 400 is time stamped to verify the validation for future use.

The RSSI sample table 400, once populated with RSSI samples 410, can be used to assist in estimating the average contention time likely to be encountered by the device 350 operating at a given OBSS PD level. The calculation of an estimated contention time for each OBSS PD level is described in greater details below with reference to FIG. 7.

Figure 5:
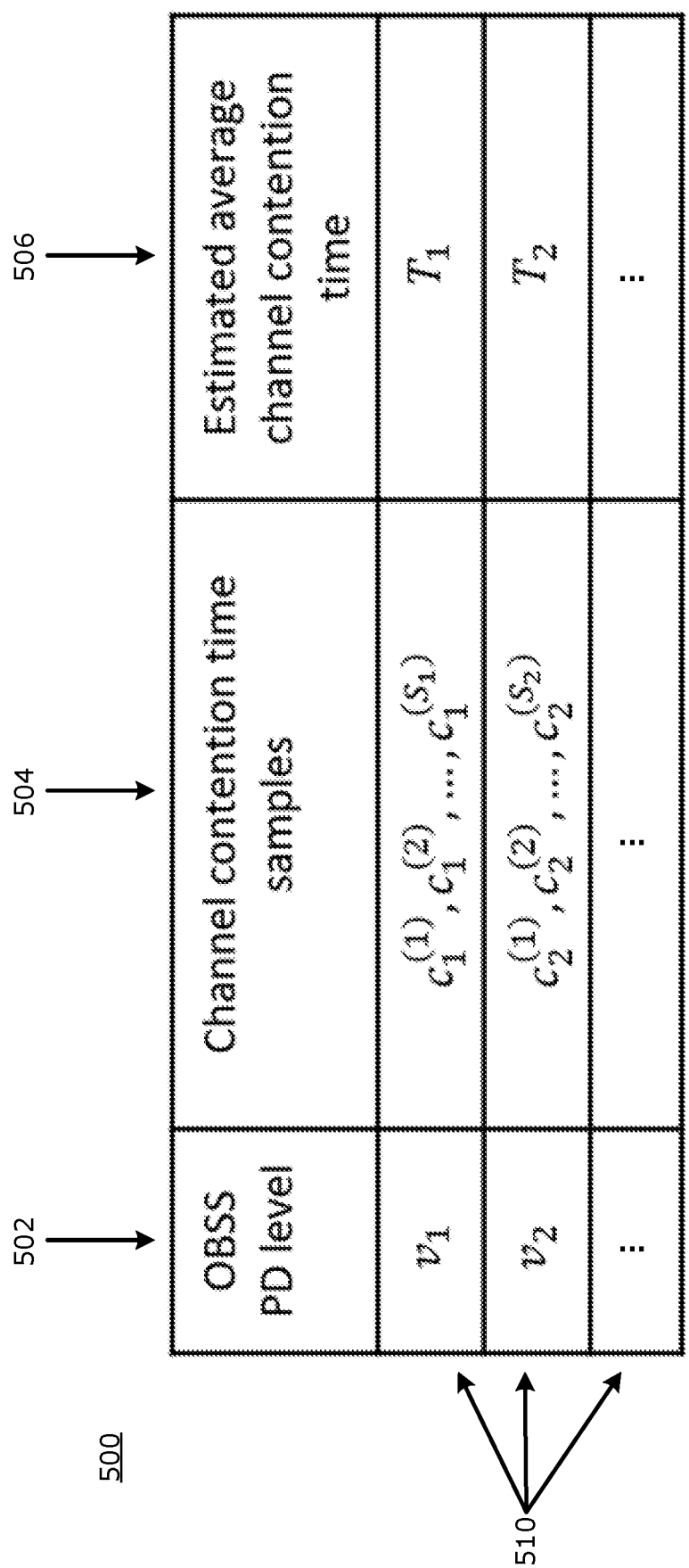
FIG. 5 is a contention time sample table according to example embodiments described herein.

FIG. 5 shows an example contention time sample table 500. The contention time sample table 500 stores a number of contention time records 510, each contention time record 510 representing data collected in connection with one or more attempts by the device 350 to transmit data over the network 112 at a given OBSS PD level. A given contention time record 510 denoted by index m includes several data fields shown as columns of the table 500: OBSS PD level 502 $v_m$ representing an OBSS PD level associated with the record 510, channel contention time samples 504 $C_m^{(1)}$ through $C_m^{(Sm)}$ representing one or more actual contention time samples encountered by the device 350 when attempting to transmit at the OBSS PD level 502 of the record 510 (wherein $S_m$ denotes the number of samples stored in record m), and an estimated average channel contention time 506 $T_m$ representing an estimated average contention time for the OBSS PD level 502 of the record 510.

In some embodiments, the OBSS PD levels available for use by the device 350 may range from −82 dBm to −62 dBm. The records 510 of the contention time sample table 500 may therefore correspond to OBSS PD levels 504 distributed across this range.

Embodiments described herein may implement a non-SRG spatial reuse algorithm to set an OBSS PD level for a network to optimize transmission time for a planned data transmission by a device (e.g., device 350 representing AP1 108) over its associated network (e.g., BSS 1 112). An example non-SRG spatial reuse algorithm will now be described with reference to the flowchart of FIG. 6.

Figure 6:
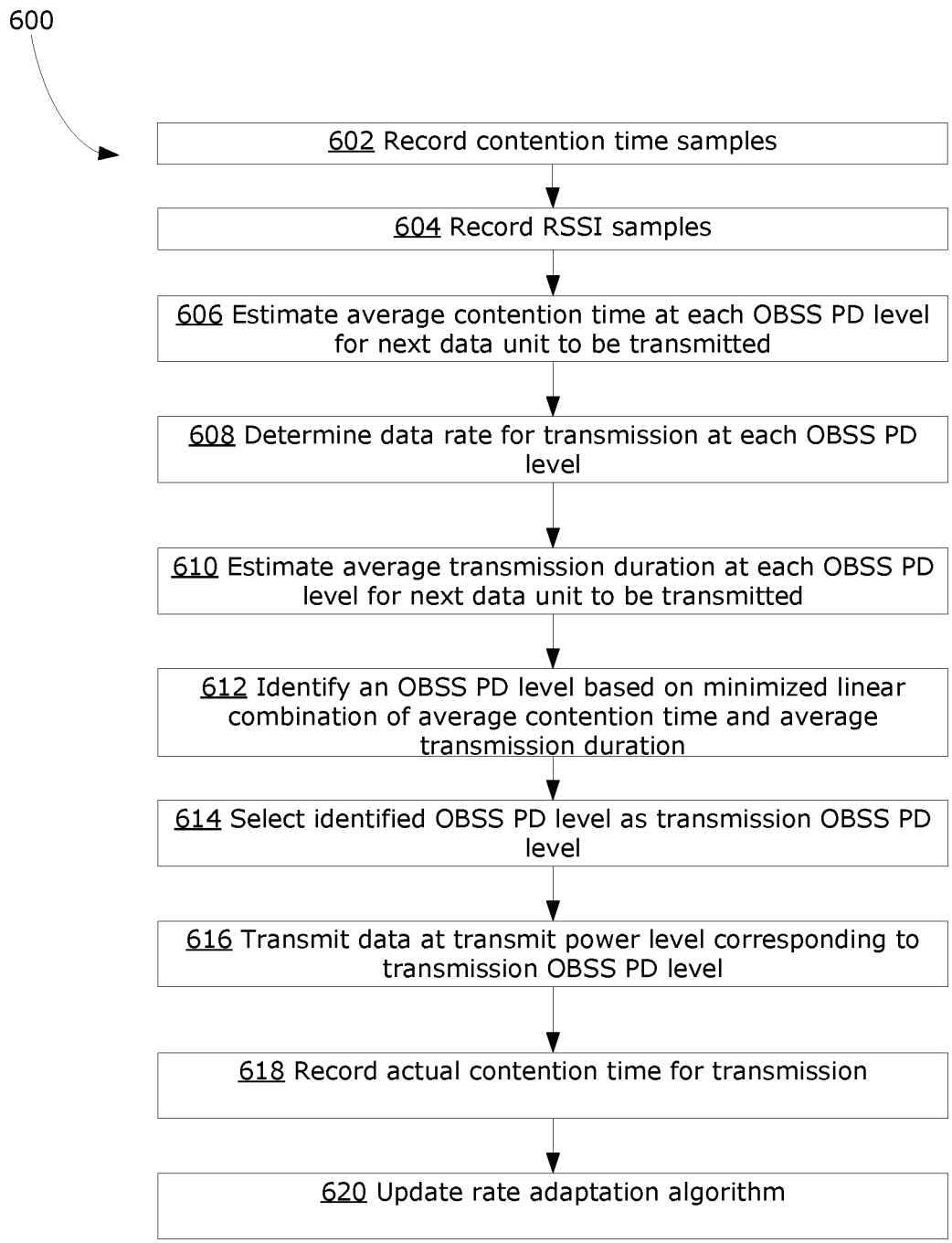
FIG. 6 is a flowchart showing the steps of a method for spatial reuse in an OBSS environment according to example embodiments described herein.

FIG. 6 shows a method 600 for spatial reuse in an OBSS environment. At 602, one or more contention time samples 504 are recorded by the device 350, e.g., in contention time records 510 in the contention time sample table 500 stored in the memory 372. CCA is performed by the device 350 prior to transmitting a data unit (e.g., a PPDU) over the network 112. The actual channel contention time for the data unit is recorded and stored in the contention time sample table 500 as a contention time sample 504 in association with one of the contention time records 510. This may be repeated an arbitrary number of times as additional data units are transmitted by the device 350.

At 604, one or more RSSI samples are recorded by the device 350, e.g., as RSSI samples 410 in the RSSI sample table 400 stored in the memory 372. The RSSI 402 of each interfering PPDU is recorded along with the interference PPDU duration (also referred to as the receiving duration or Rx duration) 404, the OBSS PPDU flag 406, and the OBSS PD level 408 of the device 350 when the interfering PPDU is received. The OBSS PPDU flag 406 may in some embodiments be determined by comparing the color of the BSS of the received interfering PPDU (i.e., a numerical identifier of the BSS from which the PPDU originated) with the color of the device's own BSS (e.g., BSS 1 112).

At 606, a next PPDU to be transmitted by the device 350 is identified, and an average channel contention time is estimated for the next PPDU for each OBSS PD level based on the previously monitored and recorded contention time samples 504. In some embodiments, the next PPDU to be transmitted is identified by selecting the Head of Line (HOL) frame at the front of the medium access (MAC) layer queue. The frame stored in the MAC layer queue may be used to identify the length of the next PPDU as well as its destination, i.e. a receiver station (denoted STA j) to which the next PPDU will be transmitted. In accordance with the examples described herein, wherein the device is device 350 included in AP 1 108 communicating on network 112, STA j may be considered to be station such as STA 104 or STA 102 also communicating on the first network 112, and may be referred to as STA j 104 or receiver station 104.

The average contention time may be estimated in some embodiments using the average contention time estimation method 700 described in greater detail below with reference to FIG. 7.

At 608, a rate adaptation algorithm is used to determine a modulation and coding scheme (MCS) for data transmitted to the receiver station 104 for each transmit power level (and therefore each OBSS PD level) considered at step 606. Determining the MCS also determines the data rate for each given OBSS PD level.

At 610, an average transmission duration for the next PPDU is estimated based on the MCS (and therefore the data rate) at each OBSS PD level. The average transmission duration for the next PPDU may be calculated by dividing the length of the next PPDU by the data rate for a given OBSS PD level.

At 612, a linear combination of the estimated average contention time and estimated average transmission duration is calculated for each OBSS PD level. In some embodiments, the linear combination of the average contention time, $T_1$, and average transmission duration, $T_2$, may be calculated as $\alpha T_1 + (1-\alpha T_2)$, where $0 \leq \alpha \leq 1$. An OBSS PD level with the lowest value of the calculated linear combination is identified.

At 614, the device 350 selects the OBSS PD level having the lowest value of the calculated linear combination for transmission of the next PPDU. In some embodiments, minimizing the linear combination comprises minimizing the sum of (average contention time+average transmission duration), which is equivalent to selecting an α value of 0.5 in the linear combination $\alpha T_1 + (1-\alpha T_2)$.

At 616, the device 350 uses a wireless communication link of the network interface 358 to transmit data over the wireless network 112 at a transmit power level corresponding to the selected transmission OBSS PD level. In some embodiments, the data to be transmitted is a data unit such as a PPDU, and it is transmitted to a known receiver station.

At 618, the actual contention time of the transmission of the PPDU at the selected OBSS PD level is recorded during CCA and stored in the contention time sample table 500 as a contention time sample 504 in association with the selected OBSS PD level 502. The estimated contention time 506 for the selected OBSS PD level 502 may be updated at this time as well in some embodiments.

At 620, the rate adaptation algorithm is updated, as described in greater detail below with reference to the example modified adaptive auto-rate fallback (AARF) algorithm of FIG. 9.

In some embodiments, the populated RSSI sample table 400 may be used to calculate various values that are used in estimating average contention time for a given OBSS PD level. The interference intensity ratio $R_{k,m}$, which is a scalar that depends on OBSS PD levels $v_k$ and $v_m$ 408, can be calculated from the RSSI sample table 400 as:

$$R_{k,m} = \frac{\sum_{i \in \mathcal{G}_k} d_i}{\sum_{i \in \mathcal{G}_m} d_i} \qquad (1)$$

wherein $$\mathcal{G}_j \equiv [i \mid f_i = 1 \text{ and } r_i \geq v_j] \equiv$$

the set of indices of OBSS frames received in a sliding time window with an RSSI greater than or equal to the $j^{th}$ OBSS PD level. (Recall that $r_m$ 402 represents the RSSI of the received PPDU, $d_m$ 404 represents the length of time over which the PPDU was received, and $f_m$ 406 represents whether the PPDU was associated with the device's own BSS (value 0) or associated with an overlapping BSS (value 1)). The time period covered by the sliding time window at a set point in time may be referred to herein as a first time period.

The ratio in equation (1) is the ratio between the estimated probability that a received OBSS frame has an RSSI larger than or equal to $v_k$ to the estimated probability that a received OBSS frame has an RSSI larger than or equal to $v_m$. The numerator and denominator in equation (1) are respectively denoted by $A_k$ and $A_m$.

Equation (1) can be derived as follows:

In a specified time window, the device 350 receives a random number of OBSS frames, denoted by N, wherein the $i^{th}$ received OBSS frame has a random transmission duration, denoted by $L_i$, and a random RSSI, denoted by $R_i$, i=1, ..., N.

The transmission durations $L_i$, i=1, ..., N, are independent and identically distributed (i.i.d.) random variables. Similarly, the received RSSIs $R_i$, i=1, ..., N, are i.i.d. random variables. Also, the variables $L_i$ and $R_i$ are independent of N, $\forall i$.

When the AP receives the $i^{th}$ OBSS frame, the channel contention time increases by a value equal to $L_i$, i=1, ..., N, iff $R_i \geq v$, where v is an OBSS PD level employed by the AP. Otherwise, if $R_i < v$, the channel contention time does not increase.

The following notation may be used herein to describe various embodiments:

$t_v^{(i)}$ denotes the increase in channel contention time of the device 350 due to receipt of the $i^{th}$ OBSS frame, i=1, ..., N.

$\tau_v$ denotes the total channel contention time encountered in the specified time window when the device 350 employs an OBSS PD level equal to v.

The variables $t_v^{(i)}$, i=1, ..., N, are i.i.d. random variables that are independent of N. Hence, $t_v$, L, and R denote random variables that have the same probability density functions as those of the random variables $t_v^{(i)}$, $L_i$, and $R_i$, respectively, for any i=1, ..., N. Consequently:

$$\tau_v = \sum_{i=1}^{N} t_v^{(i)} \qquad (2)$$

The expected value $\mathbb{E}(\tau_v)$ of the total channel contention time $\tau_v$ can be expressed as:

$$\mathbb{E}(\tau_v) = \mathbb{E}(N)\mathbb{E}(t_v) \qquad (3)$$

Applying the law of total expectation, the above equation (3) may be rewritten as:

$$\mathbb{E}(\tau_v) = \mathbb{E}(N)(\mathbb{E}(t_v | R \geq v)p(R \geq v) + \mathbb{E}(t_v | R < v)p(R < v))$$
$$= \mathbb{E}(N)(\mathbb{E}(L)p(R \geq v) + 0)$$
$$= \mathbb{E}(N)\mathbb{E}(L)p(R \geq v)$$

wherein:
$p(R \geq v)$, is the probability that the RSSI of a received OBSS frame is larger than or equal to the OBSS PD level v, and
$p(R < v)$, is the probability that the RSSI of a received OBSS frame is less than the OBSS PD level v.

Therefore:

$$\frac{\mathbb{E}(\tau_v)}{\mathbb{E}(\tau_m)} = \frac{p(R \geq v)}{p(R \geq m)} \qquad (4)$$

An example method of estimating average contention time for a given OBSS PD level will now be described with reference to FIG. 7.

Figure 7:
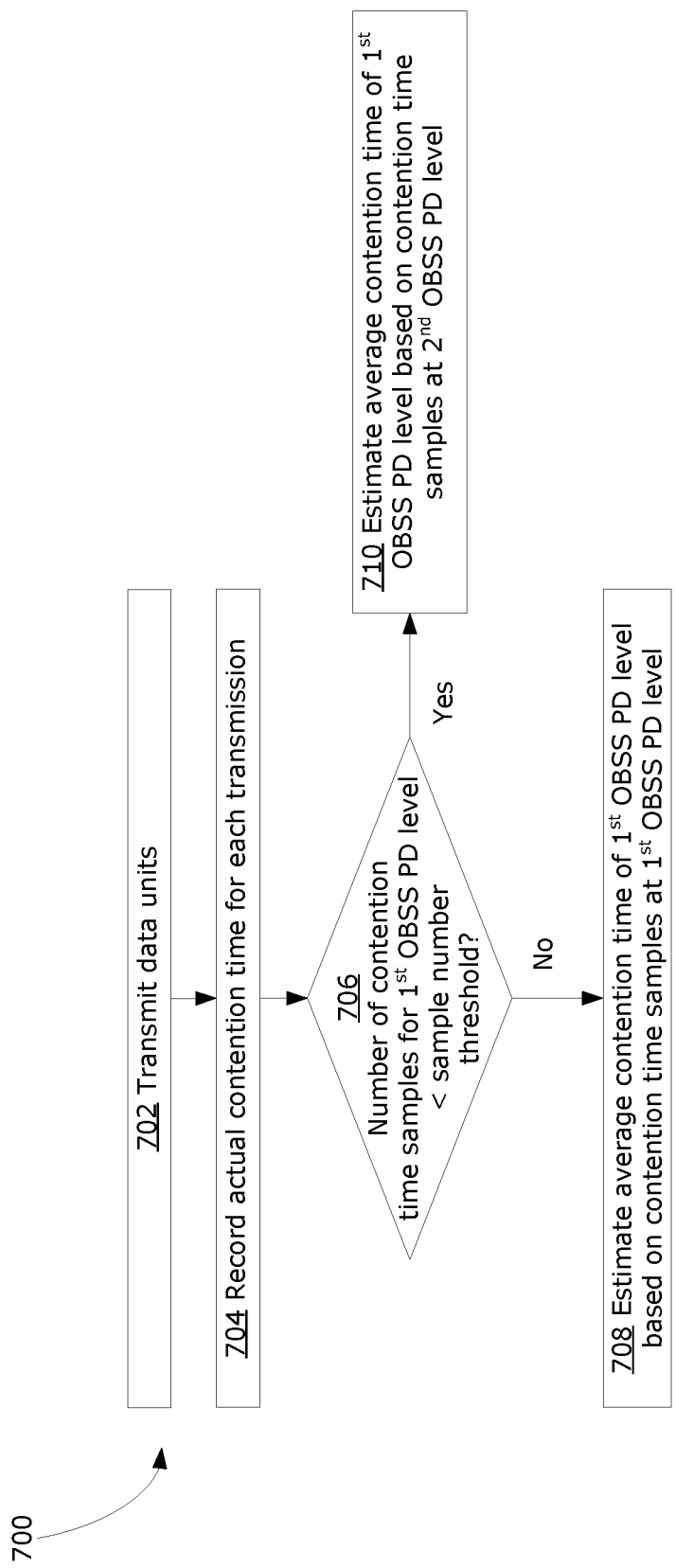
FIG. 7 is a flowchart showing the steps of a method for estimating the average contention time likely to be encountered at a given OBSS PD level according to example embodiments described herein.

FIG. 7 shows an example method 700 for estimating the average contention time likely to be encountered at a given OBSS PD level. This method 700 may be performed, or its results consulted, at step 606 of method 600.

The contention time estimation method 700 enables the selection of an OBSS PD level that will optimize contention time, and therefore in many cases overall transmission time, in some embodiments. The method 700 populates the contention time sample table 500 with actual contention time samples as well as estimated average contention times in the event that there are insufficient actual contention time samples for a given OBSS PD level. The method 700 estimates the channel contention time for different OBSS PD levels. When the actual channel contention time for a particular OBSS PD level is not available from the network, the estimated contention time for that OBSS PD level is used by method 600 for its decision processes.

At 702, one or more packets or other data units are transmitted by the device 350. The actual channel contention time and the corresponding OBSS PD level for each transmitted data unit is reported from the PHY layer through a transmission vector to the MAC layer during the sending completion interrupt.

At 704, the channel contention time 504 encountered by each transmitted data unit is recorded in the contention time sample table 500 in association with the contention time record 510 corresponding to the OBSS PD level 502 employed by the device 350 for the transmission. The contention time samples 504 for each record 510 are recorded in a sliding window, which averages the contention time samples 504 included in the record 510.

Some embodiments may relate transmit power to OBSS PD level using the same framework as the 802.11ax standard. According to the 802.11ax standard, if the OBSS PD level is increased during CCA, the transmit power is decreased by the same dBm amount. When an actual channel contention time is reported to the MAC layer, the mean $T_i$ and standard deviation $\sigma_i$ of the contention time for the corresponding OBSS PD level $v_i$ are calculated as follows:

$$T_i = \frac{1}{S_i} \sum_{j=1}^{S_i} c_i^{(j)} \qquad (5)$$

$$\sigma_i = \sqrt[2]{\frac{\Sigma(c_i^{(j)} - T_i)^2}{S_i}} \qquad (6)$$

wherein:
$c_i^{(j)}$ is the $j^{th}$ contention time sample recorded for the $i^{th}$ OBSS PD level in a sliding time window, $\sigma_i$ is the estimated standard deviation of the actual channel contention time, $S_i$ is the number of contention time samples recorded for the $i^{th}$ OBSS PD level in a sliding time window, and $T_i$ is the estimated average contention time for the $i^{th}$ OBSS PD level.

Assuming that the actual channel contention time follows a normal distribution, the upper level of the actual contention time at a 95% confidence level can be determined as follows:

$$T_i^{(u)} = T_i + z *_{\sigma i} / (\sqrt{S_i})  \quad (7)$$

wherein:

$T_i^{(u)}$ is the upper level of the actual channel contention time at a 95% confidence level, and Z is 1.96 for the 95% confidence level.

Prior to selecting an OBSS PD level for a planned data transmission, the device 350 estimates an average contention time for each potential OBSS PD level. To do so, the device performs steps 706 through 710 for each of the one or more OBSS PD levels in the contention time sample table 500.

At 706, the controller 352 identifies a number of contention time samples 504 associated with a first OBSS PD level 502 in the contention time sample table 500. The number of contention time samples 504 associated with the first OBSS PD level is compared to a predetermined sample number threshold, cp.

At 708, in response to determining that the number of contention time samples 504 associated with the first OBSS PD level 502 satisfies the predetermined sample number threshold, the controller 352 estimates the average contention time for the first OBSS PD level 502 as the average contention time 506 of the contention time samples 504 associated with the first OBSS PD level 502. As described above, in some embodiments, this average 506 is recorded in the table and updated when new samples are added rather than being calculated during step 708.

At 710, in response to determining that the number of contention time samples 504 associated with the first OBSS PD level 502 does not satisfy the predetermined sample number threshold, the controller 352 estimates the average contention time for the first OBSS PD level 502 based on a plurality of contention time samples associated with a second OBSS PD level. For example, when the actual contention time for a given OBSS PD level 502 in the contention time sample table 500 is not available, or the available time is not within the sliding window, or the number of samples is not sufficiently large (e.g., is smaller than the predetermined sample number threshold φ), the average channel contention time of the first OBSS PD level is estimated from the average channel contention time 506 of another OBSS PD level 502 recoded in a different record 510 in the contention time sample table 500.

In some embodiments, the average channel contention time $T_i$ may be regarded as having two components. The first component accounts for the increase in contention time due to receiving intra-BSS PPDUs and non-Wi-Fi interference. This component does not depend on the OBSS PD level. The second component is due to receiving OBSS PPDUs during CCA. This component is dependent on OBSS PD level. With the change of OBSS PD level, the value of this component changes.

For a certain OBSS PD level, $v_k$, if the number of available samples, $S_k$, is less than a predetermined sample number threshold, φ, due to a low number of PPDUs recently transmitted using OBSS PD level $v_k$, the average contention time, $T_k$, can be estimated as:

$$T_k = T_m(1 - D_m) + T_m D_m R_{k,m} \quad (8)$$

wherein:

$T_k$ is an estimated average contention time for an OBSS PD level $v_k$, where $S_k < \varphi$ $T_m$ is an estimated average contention time for an OBSS PD level $v_m$, where $S_m \geq \varphi$, $D_m$ is the fraction of the total channel contention time, when employing the m$^{th}$ OBSS PD level, due to reception of an OBSS frame, and $R_{k,m}$ is a scalar that depends on OBSS PD levels $v_k$ and $v_m$. This parameter is obtained from RSSI sample table 400 and discussed above.

The $T_m$ value appears at the right hand side of equation (8) in two components. The first component $T_m(1-D_m)$ accounts for the estimated average channel contention time, when employing the m$^{th}$ OBSS PD level, due to standard back-off procedure, reception of undetected Wi-Fi PPDUs, reception of non-Wi-Fi signals, or reception of PPDUs from the device's BSS STA members. The second component $T_m D_m$ accounts for the estimated average channel contention time, when employing the m$^{th}$ OBSS PD level, due to reception of an OBSS frame.

$D_m$ can be obtained from the interference information in the RSSI sample table 400 and the channel contention time reported to the MAC layer for a given OBSS PD level, as follows:

$$D_m = \frac{\sum_{i \in \mathcal{H}_m} d_i}{\sum_{i=1}^{S_m} c_m^{(i)}} \quad (9)$$

wherein $\mathcal{H}_{m\,m} \equiv \{i | f_i=1, l_i=v_m, \text{ and } r_i \geq v_m\} \equiv$ the set of indices of OBSS frames received in a sliding time window, when employing the m$^{th}$ OBSS PD level, with an RSSI greater than or equal to the m$^{th}$ OBSS PD level.

The numerator of equation (9) is the total time duration in a sliding time window, when employing the m$^{th}$ OBSS PD level, spent in receiving an OBSS frame with an RSSI greater than or equal to the m$^{th}$ OBSS PD level. The denominator of equation (9) is the total channel contention time in a sliding time window when employing the m$^{th}$ OBSS PD level.

Once the average contention time has been estimated for the first OBSS PD level 502, the method 700 returns to step 706 for a second OBSS PD level 502 of a second record 510 in the contention time sample table 500, and iterates steps 706 through 710 until an average contention time has been estimated for each record 510.

Thus, estimating the average contention time for a first OBSS PD level (having an insufficient number of samples) based on the average contention time for a second OBSS PD level (having a sufficient number of samples) involves first determining an average contention time $T_m$ for the second OBSS PD level as the average contention time 506 of the contention time samples 504 associated with the second OBSS PD level 502 of the corresponding record 510. Second, the controller 352 determines a first fraction $D_m$ of contention time at the second OBSS PD level attributable to reception of an OBSS frame, e.g., using the RSSI sample table 400 and equation (9) above. Third, the controller 352 determines a second fraction $(1-D_m)$ of contention time at the second OBSS PD level that is not attributable to reception of an OBSS frame, the sum of the first fraction $D_m$ and the second fraction $(1-D_m)$ being equal to one. Fourth, the controller 352 determines a first value $A_k$ that is equal to the total duration of received OBSS frames in a sliding time window with an RSSI greater than or equal to the first OBSS PD level $v_k$. $A_k$ is the numerator of equation (1) used to calculate $R_{k,m}$. Fifth, the controller 352 determines a second value $A_m$ that is equal to the total duration of receiving OBSS frames in a sliding time window with an RSSI greater than or equal to the second OBSS PD level $V_m$. $A_m$ is the denominator of equation (1) used to calculate $R_{k,m}$. Finally, the controller 352 estimates the average contention time $T_k$ for the first OBSS PD level $v_k$ as being equal to the average contention time $T_m$ for the second OBSS PD level $v_m$ times the second fraction $(1-D_m)$, plus the average contention time $T_m$ for the second OBSS PD level $v_m$ times the first fraction $D_m$ times the first calculated value $A_k$ divided by the second calculated value $A_m$: $T_k=T_m(1-D_m)+T_mD_mA_k/A_m$ (i.e. equation 8 above). It will be appreciated that $A_k$ is proportional to the total duration of received OBSS frames having an RSSI greater than or equal to $v_k$, whereas $A_m$ is proportional to the total duration of received OBSS frames having an RSSI greater than or equal to $v_m$.

In some embodiments, the controller 352 selects the second OBSS PD level $v_m$ 502, and therefore the record 510 to be used to calculate the estimated average contention time of the first OBSS PD level $v_k$, based on the number of contention time samples 504 associated with the second OBSS PD level 502. Thus, for example, a record 510 may be selected from the contention time samples table 500 because it has enough contention time samples 504 to satisfy the sample number threshold, or because it has more samples 504 than any other record 510 in the table 500. The OBSS PD level 502 of the selected record 510 is then used as the second OBSS PD level $v_k$ for the purposes of the calculations described above.

In other embodiments, the controller 352 selects the second OBSS PD level based on the proximity of the first OBSS PD level to the second OBSS PD level. Thus, for example, to estimate an average contention time for a first OBSS PD level 502 of −80 dBm, the controller 352 may first consult the record 510 having an OBSS PD level 502 of −80 dBm. If the number of contention time samples 504 in that record 510 fails to satisfy the sample count threshold, the controller 352 will then consult records 510 in the table 500 having OBSS PD levels 504 close to −80 dBm. For example, if the table 500 contains a record 510 for OBSS PD level 502=−82 dBm and another record 510 for OBSS PD level 502=−75 dBm, the record 510 for −82 dBm will be consulted first. If the −82 dBm record 510 has enough contention time samples 504 to satisfy the sample count threshold, then the −82 dBm record 510 will be used as the second OBSS PD level $v_k$ for the purposes of the calculations described above, and given preference over the −75 dBm record 510.

In other embodiments, a plurality of two or more records 510 may be used to estimate the average contention time for the first OBSS PD level. The estimated average contention time for the first OBSS PD level would thus be calculated based on a plurality of contention time samples associated with a plurality of OBSS PD levels (and therefore a plurality of records 510) in the table 500. This approach could be used, for example, in cases wherein no record 510 satisfied the sample count threshold but wherein multiple records 510 in aggregate contained a sufficient number of samples 504 to enable calculation of a reliable estimate of contention time at the first OBSS PD level.

As noted above, if the controller 352 determines that the contention time samples in the contention time sample table 500 in memory 372 do not satisfy a sample population metric (as described above), the controller 352 may select a minimum OBSS PD level (e.g., −82 dBm) as the transmission OBSS PD level. In various embodiments, the minimum OBSS PD level may have a value that diverges from the value of −82 dBm dictated by the 802.11ax standard. Some embodiments may set the minimum OBSS PD level to a value between −85 dBm and −70 dBm.

In some embodiments, two or more of the various approaches described above may be used to choose a second OBSS PD level $v_k$ for estimating the average contention time for the first OBSS PD level. The different approaches could be employed under different circumstances, as determined, e.g., by the controller 352 consulting the state of the RSSI sample table 400, contention time sample table 500, and other data or parameters.

Example methods and operations will now be described for implementing steps 608 and 610 of method 600, namely determining the modulation and coding scheme (MCS) using a rate adaptation algorithm (step 608) and estimating an average transmission time for the next PPDU (step 610), with reference to FIG. 8-10.

A rate adaptation algorithm may be used in some embodiments to provide the modulation and coding scheme (MCS) index, i.e., the data rate, that can be used for PPDU transmission to receiver station STA j 104 using each transmit power level corresponding to each available OBSS PD level. Some embodiments may use a modified adaptive auto-rate fallback (AARF) algorithm to consider the transmit power level to a certain receiver STA, which is not generally considered by a conventional AARF algorithm. In other embodiments, any rate adaptation algorithm that provides the data rate for a specified transmit power level to a destination STA can be employed.

In an example modified AARF algorithm, each access point maintains a number of rate adaptation tables for each STA associated with the access point. The rate adaptation tables are associated with different data unit lengths P, e.g., three rate adaptation tables associated with P<1 kilobyte, 1 kilobyte<P<2 kilobytes, and P>2 kilobytes. The range of OBSS PD levels and corresponding transmit powers is consistent with the example described above: transmit power ranges 20 dBm from a minimum Tx power level 214 to the reference Tx power level 210, whereas the OBSS PD level ranges 20 dBm from a maximum OBSS PD level 206 down to a minimum OBSS PD level 208. Each rate adaptation table has a number of rows; each row corresponds to a possible transmit power level and an MCS value that yields a successful transmission to the destination at the corresponding power level. The first row corresponds to the minimum transmit power level 214 and the last row corresponds to the reference transmit power level 210.

Figure 8:
FIG. 8 is a rate adaptation table according to example embodiments described herein.

FIG. 8 shows an example rate adaptation table 800 for a certain PPDU length, e.g., P>2 kilobytes. The table 800 has a number of rows, the first row 802 corresponding to the minimum transmit power level 214 and the last row 804 corresponding to the reference transmit power level 210. The table has two columns: a first column representing the transmit power level 806 and a second column representing an MCS value 808 that yields a successful transmission to the destination at the corresponding transmit power level 806.

Figure 9:
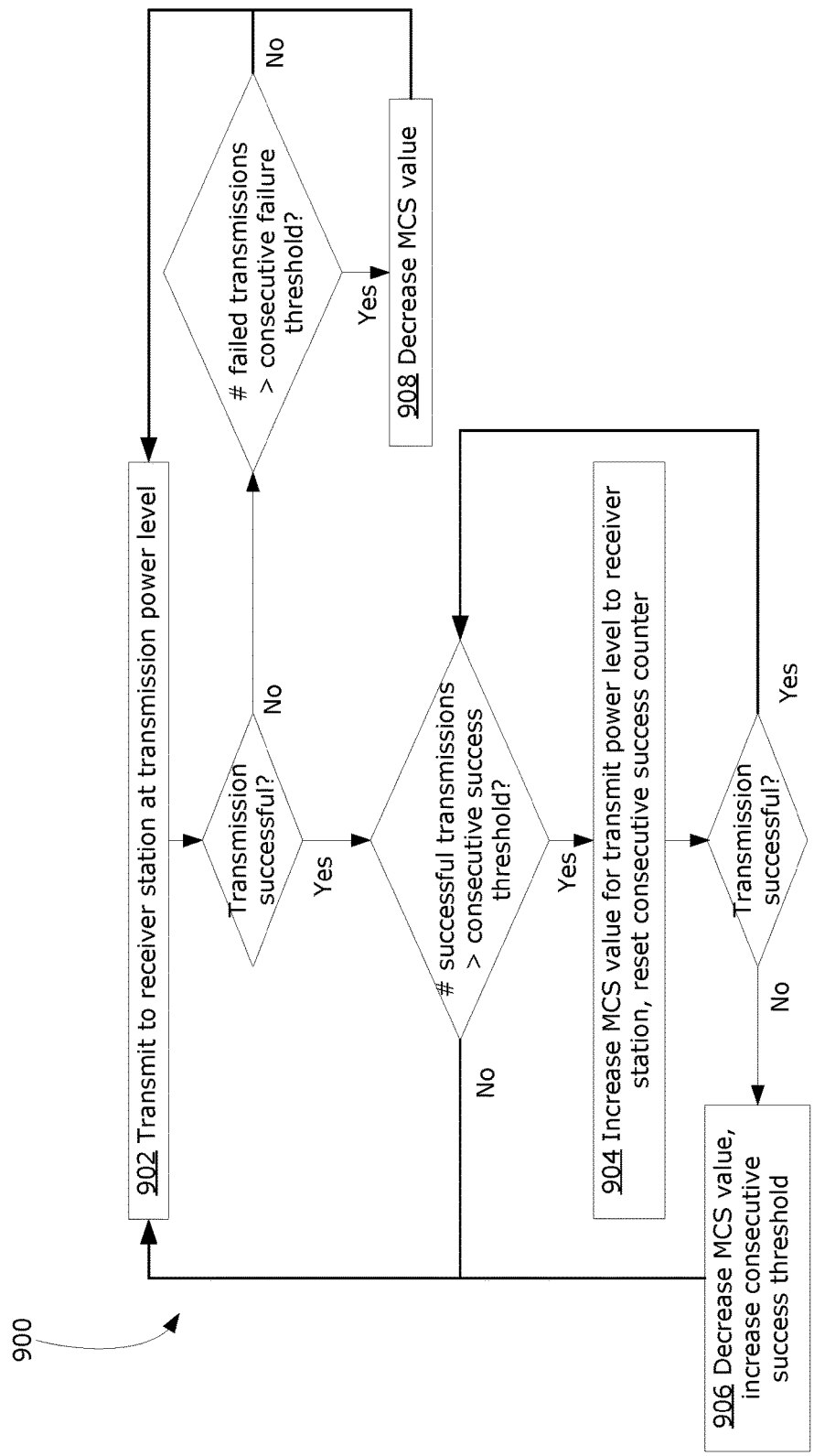
FIG. 9 is a flowchart showing the steps of a method for updating the MCS value for a given transmit power level according to example embodiments described herein.

FIG. 9 shows an example method 900 of updating the MCS value for a given transmit power level used for transmitting data to the receiver STA. After every transmission, the MCS value for the corresponding transmit power for the receiver STA may be updated by performing the steps of method 900.

At 902, a transmission is made by the device 350 to the receiver STA 108 at a given transmit power level.

At 904, if the transmission is successful, and if the number of successful data transmissions at the given transmit power level to the receiver STA 108 is higher than a predetermined consecutive success threshold, the MCS value associated with the given transmit power level is increased to a higher value. The counter of consecutive successes is also reset to zero.

At 906, after increasing the MCS, if the immediate next data unit transmission to the receiver STA 108 fails, the MCS is reverted to the previous (lower) value and the consecutive success threshold is increased (e.g., by a factor of two) to stop toggling between the two MCS values.

At 908, if a consecutive number of failed data unit transmissions to the receiver STA 108 is larger than a consecutive failure threshold, the MCS value is reduced.

The example modified AARF algorithm described above may be queried for an MCS value corresponding to a transmit power level and a receiver STA. This query provides as inputs the transmit power level, the length P of the data unit (e.g., PPDU) to be transmitted in the next medium access, and an identifier for the receiver STA 108. The query returns $M_i$, the last MCS that resulted in successful packet transmission to the receiver STA 108 at the given transmit power.

Once a data rate has been determined for each OBSS PD level using the AARF algorithm described above, an average transmission time is estimated for the next PPDU to be transmitted to the receiver station (i.e. step 610 of method 600). A transmission time estimation method 1000 will now be described with reference to FIG. 10.

Figure 10:
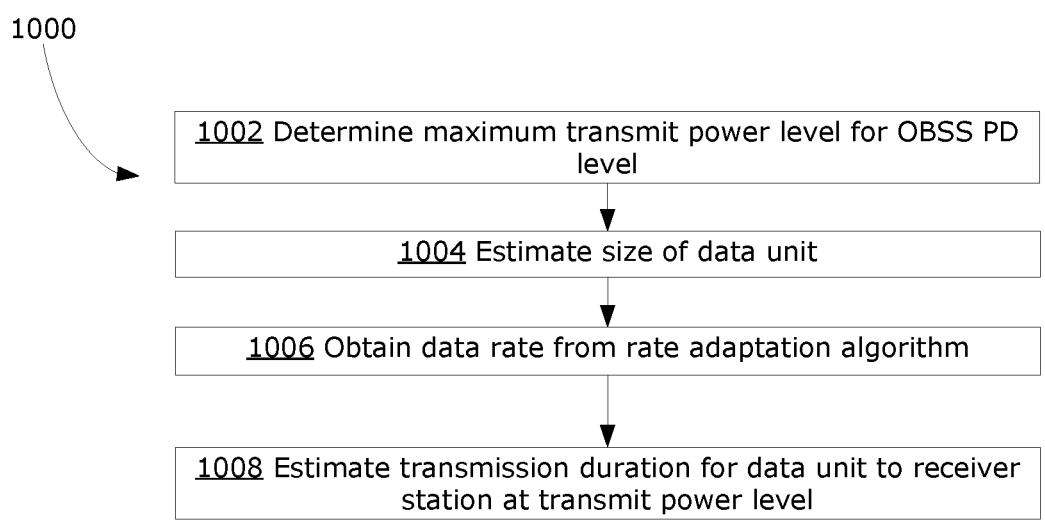
FIG. 10 is a flowchart showing the steps of a method for estimating the time required to transmit a data unit at a given OBSS PD level according to example embodiments described herein.

FIG. 10 shows a method 100 for estimating the time required to transmit a data unit (e.g., PPDU) at a given OBSS PD level. When the OBSS PD level is low, the data unit can be transmitted at a higher transmit power. As a result, the transmission can support a higher MCS value, and consequently the transmission time of the PPDU is smaller. However, the lower OBSS PD level also increases the channel contention time. On the other hand, a higher OBSS PD level reduces the contention for the channel, reducing the channel contention time; but the transmit power of the PPDU is also reduced, which results in a smaller MCS value and therefore a longer transmission time. Therefore, there is a trade-off between the OBSS PD level and the data rate in the channel. The device 350 implementing method 600 is configured to balance this trade-off by adjusting the OBSS PD level.

Figure 2:
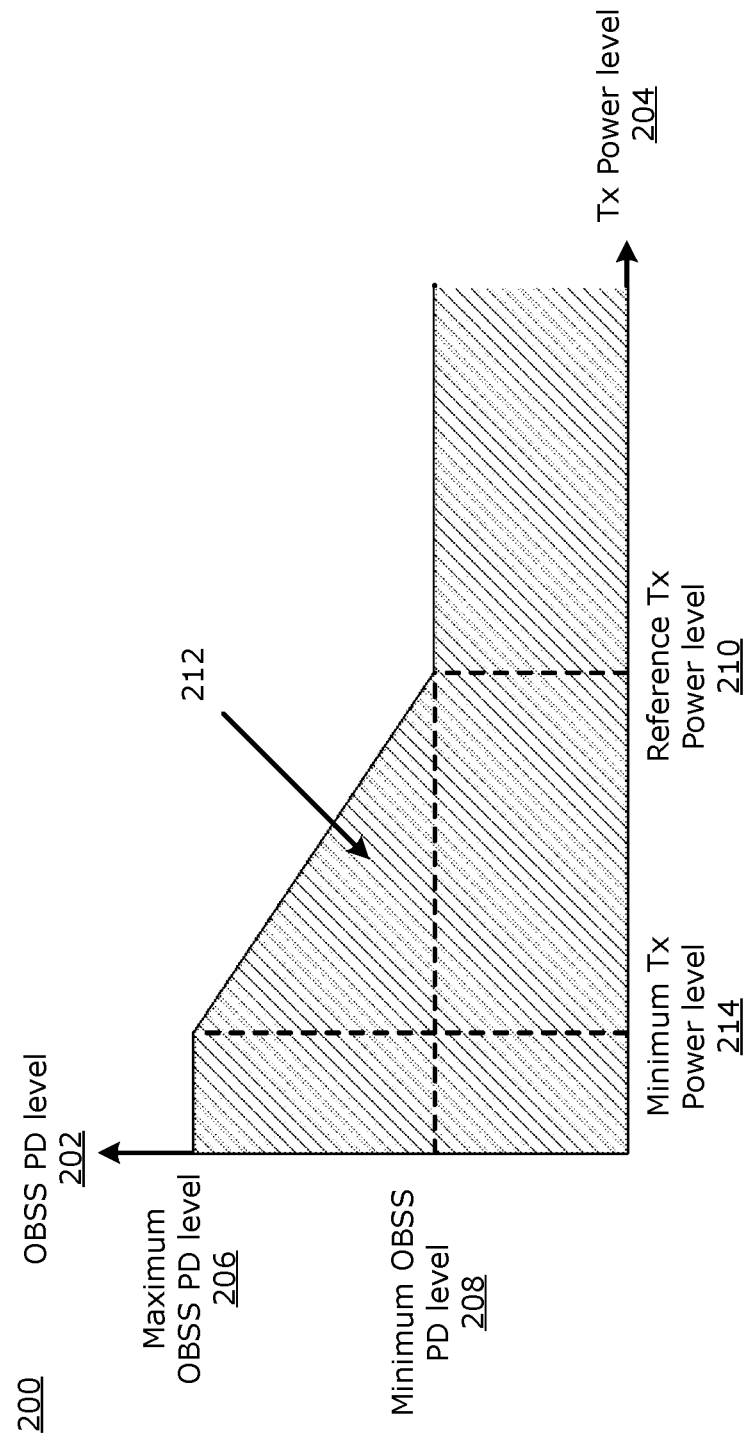
FIG. 2 is a graph of permissible transmit power in relation to OBSS PD level in a non-SRG OBSS environment, showing an example context in which example embodiments in accordance with the present disclosure may operate.

At 1002, the controller determines a maximum allowable transmit power for a first OBSS PD level $v_i$ ($-82 \leq v_i \leq -62$ dBm in the examples above), as shown in FIG. 2. The maximum allowable transmit power, TxPwr (i), can be calculated as:

$$TxPwr(i) = TxPwr\_ref - (v_i - OBSS\_PD\_min) \quad (10)$$

where TxPwr_ref is the reference transmit power as discussed in the 802.11ax standard.

At 1004, the size of the data unit is estimated. In some cases, the size of the data unit will be known, e.g., the length of the physical layer service data unit (PSDU) to be transmitted to the receiver station. In other cases, the size of the data unit is unknown. In such cases, the average size of data units previously transmitted to receiver STA j 108 is employed. The data unit size, P, is a function of the value of the MCS. As the number of successful data unit transmissions exceeds the consecutive success threshold, the value of the MCS for the corresponding OBSS PD level is increased. Due to the increase in the MCS value, the size of the next data unit may increase. The data unit length, P, is updated after every successful delivery of the data unit, as follows:

$$P = P(\text{mean}) \times (1 - \text{scaling factor}) + P(\text{last}) \times (\text{scaling factor}) \quad (11)$$

wherein:
P is the size of the data unit to be used in estimating the transmission duration of the next data unit,
P (mean) is the mean size of the data unit that was used to estimate the transmission duration of the last transmission,
P (last) is the actual size of the last transmitted data unit, and scaling factor is set to a default value of 0.5 in this example embodiment.

Thus, identifying the estimated size of the data unit to be transmitted to the receiver station requires first identifying an average size of one or more data units previously transmitted by the device to the receiver station.

At 1006, the data rate for the OBSS PD level is obtained by querying the rate adaptation algorithm (e.g., the modified AARF algorithm) as described above.

At 1008, based on the provided data rate for the $i^{th}$ available OBSS PD level, denoted by $M_i$, and the size of the data unit that will be transmitted to STA j 108, denoted by P, the data unit transmission duration for the $i^{th}$ available OBSS PD level, denoted by $Q_i$, is determined $\forall i$ using:

$$Q_i = \frac{P}{M_i}$$

Method 1000 may in some embodiments implement step 608 of method 600. Thus, step 608 of method 600 may in some embodiments be implemented as querying the rate adaptation algorithm for an MCS value corresponding to a given transmit power level, a given receiver STA, and a given data unit size P. This may be considered to constitute a number of sub-steps. First, the controller 352 identifies a receiver station (e.g. STA 104) in communication with the device 350 through the wireless network (e.g., BSS 1 112). Second, the controller 352 identifies an estimated size or length of a data unit (e.g., a PPDU) to be transmitted by the device 352 to the receiver station 104 through the wireless network 112. Third, the controller 352 determines a data rate that can be used for data unit transmission to the receiver station 104 through the wireless network 112 at a given OBSS PD level 502: specifically, the controller 352 queries the data rate algorithm, providing the data unit length, receiver station identifier, and a power level corresponding to the OBSS PD level, and the data rate algorithm returns an MCS value indicating a data rate. Finally, the controller 352 estimates the average transmission duration for the given OBSS PD as equal to the estimated size of the data unit divided by the data rate.

Examples will now be described for implementing step 612 (calculating a linear combination of the estimated average contention time and estimated average transmission duration for each OBSS PD level) and step 614 (selecting the OBSS PD level having the lowest value of the calculated linear combination) of method 600.

After the average contention time and average transmission duration have been estimated for each OBSS PD level as described above, the controller 352 may decide whether to employ spatial reuse by comparing the time required to deliver the data unit to its destination STA if spatial reuse is employed with the time required to deliver the data unit if no spatial reuse is employed. The controller 352 then decides the transmission OBSS PD level to use based on the minimum time required for the data unit delivery.

The controller 352 calculates the total time, $\Gamma_i$, required to deliver the data unit at each OBSS PD level $v_i$. $\Gamma_i$ is the sum of the estimated average channel contention time $T_i$ and the estimated average transmission duration $Q_i$ of the data unit, at the given OBSS PD level, to the given receiver station 104. However, to introduce a flexibility in the $\Gamma_i$ calculation, the $\Gamma_i$ value is calculated as a linear combination of $T_i$ and $Q_i$, using a parameter $\alpha$, where $0 \leq \alpha \leq 1$:

$$\Gamma_i = \alpha T_i + (1 - \alpha) Q_i \quad (12)$$

Finally an OBSS PD level $v_k$ is selected such that:

$$k = \underset{i}{\operatorname{argmin}}(\Gamma_i) \quad (13)$$

In other words, the selected OBSS PD level has the lowest value of the linear combination calculated for the OBSS PD levels considered. The selected OBSS PD level is used as the transmission OBSS PD level.

An example CCA algorithm for use with method 600 is now described. It will be appreciated that the example CCA algorithm is based on a conventional Wi-Fi CCA algorithm or protocol.

The example CCA algorithm determines the state of the channel during the channel contention process. If the device 350 receives an intra-BSS PPDU during channel contention, the device 350 stops the decrement of the backoff counter and waits until the channel is idle. If the device 350 receives an OBSS PPDU and the RSSI of the received interference signal is lower than the OBSS PD level, the device 350 can disregard the interference and continue the channel access process. However, if the received interference is higher than the OBSS PD level, the channel is considered busy and the channel contention process is stopped until the channel is idle.

At the end of the backoff process, medium access is granted to the device 350. After the backoff process, if the backoff counter is equal to zero, then the data unit is transmitted. The transmit power, data unit size, and receiver station identifier are reported to the rate adaptation algorithm (e.g., the modified AARF algorithm) to query for an MCS value. The actual contention time c; is recorded as a contention time sample 504 in the contention time sample table 500 in association with OBSS PD level v; 502 for calculating the estimated contention time 506 for the next data unit transmission. The average contention time 506 based on $c_i$, $v_i$ is updated. Received OBSS data units are recorded as samples in the RSSI sample table 400: the RSSI 402, PPDU duration 404, and OBSS PPDU flag 406 values are saved to the row 410 having OBSS PD level $v_i$.

General

The present disclosure provides certain example algorithms and calculations for implementing examples of the disclosed methods and operations. However, the present disclosure is not bound by any particular algorithm or calculation. Although the present disclosure describes methods and processes with steps in a certain order, one or more steps of the methods and processes may be omitted or altered as appropriate. One or more steps may take place in an order other than that in which they are described, as appropriate.

Through the descriptions of the preceding embodiments, the present invention may be implemented by using hardware only, or by using software and a necessary universal hardware platform, or by a combination of hardware and software. Based on such understandings, the technical solution of the present invention may be embodied in the form of a software product. The software product may be stored in a non-volatile or non-transitory storage medium, which can be a compact disk read-only memory (CD-ROM), USB flash drive, or a hard disk. The software product includes a number of instructions that enable a computer device (personal computer, server, or network device) to execute the methods provided in the embodiments of the present invention.

Although the present invention and its advantages have been described in detail, it should be understood that various changes, substitutions and alterations can be made herein without departing from the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A device comprising:
a wireless communication link for communicating over a wireless network;
a controller configured to:
estimate an average transmission duration for each of one or more overlapping basic service set (OBSS) packet detection (PD) levels of the wireless network;
estimate an average contention time for each of the one or more OBSS PD levels;
select a transmission OBSS PD level based on a linear combination of the estimated average transmission duration and estimated average contention time for each of the one or more OBSS PD levels; and
use the wireless communication link to transmit data over the wireless network at a transmit power level corresponding to the selected transmission OBSS PD level.

2. The device of claim 1,
further comprising a memory storing one or more contention time samples, each contention time sample corresponding to an actual contention time recorded for the transmission of a data unit over the wireless network by the device,
wherein the controller is further configured to:
identify a number of contention time samples associated with a first OBSS PD level of the one or more OBSS PD levels; and
in response to determining that the number of contention time samples associated with the first OBSS PD level satisfies a predetermined sample number threshold:
estimate the average contention time for the first OBSS PD level as the average of the stored contention time samples associated with the first OBSS PD level.

3. The device of claim 2, wherein the controller is further configured to:
in response to determining that the number of contention time samples associated with the first OBSS PD level does not satisfy the predetermined sample number threshold:
estimate the average contention time for the first OBSS PD level based on a plurality of contention time samples associated with a second OBSS PD level.

4. The device of claim 3, wherein estimating the average contention time for the first OBSS PD level based on the plurality of contention time samples associated with a second OBSS PD level comprises:
determining an average contention time $T_m$ for the second OBSS PD level as the average contention time of the stored contention time samples associated with the second OBSS PD level;
determining a first fraction $D_m$ of contention time at the second OBSS PD level attributable to reception of an OBSS frame by dividing:
the sum of the durations of each OBSS frame received by the device in a first time period, when employing the second OBSS PD level, with a received signal strength indicator (RSSI) greater than or equal to the second OBSS PD level; by
the sum of the stored contention time samples associated with the second OBSS PD level in the first time period;
determining a second fraction $(1-D_m)$ of contention time at the second OBSS PD level not attributable to reception of an OBSS frame, the sum of the first fraction and second fraction being equal to one;
determining a first value $A_k$ proportional to the total duration of OBSS frames received in the first time period having an RSSI equal to or greater than the first OBSS PD level;
determining a second value $A_m$ proportional to the total duration of OBSS frames received in the first time period having an RSSI equal to or greater than the second OBSS PD level;
estimating the average contention time for the first OBSS PD level as being equal to the average contention time for the second OBSS PD level times the second fraction, plus the average contention time for the second OBSS PD level times the first fraction times the first value $A_k$ divided by the second value $A_m$ such that $(T_k = T_m(1-D_m) + T_m D_m A_k/A_m)$.

5. The device of claim 3, wherein the controller is further configured to select the second OBSS PD level based on the number of contention time samples associated with the second OBSS PD level.

6. The device of claim 3, wherein the controller is further configured to select the second OBSS PD level based on the proximity of the first OBSS PD level to the second OBSS PD level.

7. The device of claim 2, wherein the controller is further configured to:
in response to determining that the number of contention time samples associated with the first OBSS PD level does not satisfy the predetermined sample number threshold:
estimate the average contention time for the first OBSS PD level based on a plurality of contention time samples associated with a plurality of OBSS PD levels.

8. The device of claim 2, wherein the controller is further configured to:
in response to determining that the contention time samples in the memory do not satisfy a sample population metric:
select a minimum OBSS PD level as the transmission OBSS PD level.

9. The device of claim 8, wherein the minimum OBSS PD level is between negative 85 decibel-milliwatts (dBm) and negative 70 dBm.

10. The device of claim 1, wherein the controller is configured to estimate the average transmission duration for an OBSS PD level by:
identifying a receiver station in communication with the device through the wireless network;
identifying an estimated size of a data unit to be transmitted by the device to the receiver station through the wireless network;
determining a data rate that can be used for data unit transmission to the receiver station through the wireless network at the OBSS PD level; and
estimating the average transmission duration for the OBSS PD as equal to the estimated size of the data unit divided by the data rate.

11. The device of claim 10, wherein identifying the estimated size of the data unit comprises identifying an average size of one or more data units previously transmitted by the device to the receiver station.

12. The device of claim 11,
further comprising a memory storing one or more contention time samples, each sample corresponding to an actual contention time recorded for the transmission of a data unit over the wireless network by the device,
wherein:
the controller is further configured to:
identify a number of contention time samples associated with a first OBSS PD level of the one or more OBSS PD levels;
in response to determining that the number of contention time samples associated with the first OBSS PD level satisfies a predetermined sample number threshold, estimate the average contention time for the first OBSS PD level as the average of the stored contention time samples associated with the first OBSS PD level; and
in response to determining that the number of contention time samples associated with the first OBSS PD level does not satisfy the predetermined sample number threshold, estimate the average contention time for the first OBSS PD level based on a plurality of contention time samples associated with a second OBSS PD level; and selecting the transmission OBSS PD level comprises:
determining the linear combination of the estimated average transmission duration and estimated average contention time for each of the one or more OBSS PD levels;
identifying an OBSS PD level of the one or more OBSS PD levels having a minimized linear combination of the one or more OBSS PD levels; and
selecting the identified OBSS PD level as the transmission OBSS PD level.

13. A method, comprising:
estimating an average transmission duration for each of one or more overlapping basic service set (OBSS) packet detection (PD) levels of a wireless network;
estimating an average contention time for each of the one or more OBSS PD levels;
selecting a transmission OBSS PD level based on a linear combination of the estimated average transmission duration and estimated average contention time for each of the one or more OBSS PD levels; and
transmitting data over the wireless network at a transmit power level corresponding to the selected transmission OBSS PD level.

14. The method of claim 13, wherein estimating an average contention time for an OBSS PD comprises:
identifying a number of contention time samples associated with the OBSS PD level, each sample corresponding to an actual contention time recorded for the transmission of a data unit over the wireless network; and
in response to determining that the number of contention time samples associated with the OBSS PD level satisfies a predetermined sample number threshold, estimating the average contention time for the OBSS PD level as the average of the stored contention time samples associated with the OBSS PD level.

15. The method of claim 13, wherein estimating an average contention time for a first OBSS PD of the one or more OBSS PD levels comprises:
identifying a number of contention time samples associated with the first OBSS PD level, each sample corresponding to an actual contention time recorded for the transmission of a data unit over the wireless network; and
in response to determining that the number of contention time samples associated with the first OBSS PD level does not satisfy the predetermined sample number threshold, estimating the average contention time for the first OBSS PD level based on a plurality of contention time samples associated with a second OBSS PD level of the one or more OBSS PD levels.

16. The method of claim 15, wherein estimating the average contention time for the first OBSS PD level based on the plurality of contention time samples associated with a second OBSS PD level comprises:
determining an average contention time $T_m$ for the second OBSS PD level as the average of the stored contention time samples associated with the second OBSS PD level;
determining a first fraction $D_m$ of contention time at the second OBSS PD level attributable to reception of an OBSS frame by dividing:
the sum of the durations of each OBSS frame received by the device in a first time period, when employing the second OBSS PD level, with a received signal strength indicator (RSSI) greater than or equal to the second OBSS PD level; by
the sum of the stored contention time samples associated with the second OBSS PD level in the first time period;
determining a second fraction $(1-D_m)$ of contention time at the second OBSS PD level not attributable to reception of an OBSS frame, the sum of the first fraction and second fraction being equal to one;
determining a first value $A_k$ proportional to the total duration of received OBSS frames received in the first time period having an RSSI equal to or greater than the first OBSS PD level;
determining a second value $A_m$ proportional to the total duration of received OBSS frames received in the first time period having an RSSI equal to or greater than the second OBSS PD level;
estimating the average contention time for the first OBSS PD level as being equal to the average contention time for the second OBSS PD level times the second fraction, plus the average contention time for the second OBSS PD level times the first fraction times the first value $A_k$ divided by the second value $A_m$ such that $(T_k=T_m(1-D_m)+T_m D_m A_k/A_m)$.

17. The method of claim 13, wherein estimating the average transmission duration for an OBSS PD level comprises:
identifying a receiver station in communication with the wireless network;
identifying an estimated size of a data unit to be transmitted to the receiver station through the wireless network;
determining a data rate that can be used for data unit transmission to the receiver station through the wireless network at the OBSS PD level; and
estimating the average transmission duration for the OBSS PD as equal to the estimated size of the data unit divided by the data rate.

18. The method of claim 17, wherein identifying the estimated size of the data unit comprises identifying an average size of one or more data units previously transmitted to the receiver station.

19. The method of claim 18, wherein:
estimating an average contention time for an OBSS PD comprises:
identifying a number of contention time samples associated with the OBSS PD level, each sample corresponding to an actual contention time recorded for the transmission of a data unit over the wireless network; and
in response to determining that the number of contention time samples associated with the OBSS PD level satisfies a predetermined sample number threshold, estimating the average contention time for the OBSS PD level as the average of the stored contention time samples associated with the OBSS PD level; and
selecting the transmission OBSS PD level comprises:
determining a linear combination of the estimated average transmission duration and estimated average contention time for each of the one or more OBSS PD levels;
identifying an OBSS PD level of the one or more OBSS PD levels having a minimized linear combination of the one or more OBSS PD levels; and
selecting the identified OBSS PD level as the transmission OBSS PD level.

20. A non-transitory processor readable medium having tangibly stored thereon executable instructions that, when executed by a controller, cause the controller to perform the method of claim 13.

* * * * *